US007012221B2

(12) United States Patent
Li

(10) Patent No.: US 7,012,221 B2
(45) Date of Patent: *Mar. 14, 2006

(54) ROASTING OVEN WITH DUAL HEATING ELEMENTS

(76) Inventor: George T. C. Li, 2533 N. Carson St., Suite #0 98, Carson City, NV (US) 89706

( * ) Notice: Subject to any disclaimer, the term of this patent is extended or adjusted under 35 U.S.C. 154(b) by 0 days.

This patent is subject to a terminal disclaimer.

(21) Appl. No.: 10/772,224

(22) Filed: Feb. 3, 2004

(65) Prior Publication Data

US 2004/0188412 A1 Sep. 30, 2004

Related U.S. Application Data

(63) Continuation-in-part of application No. 10/302,202, filed on Nov. 22, 2002, now Pat. No. 6,686,569, which is a continuation-in-part of application No. 09/971,286, filed on Oct. 5, 2001, now Pat. No. 6,509,550.

(51) Int. Cl.
   A47J 37/06 (2006.01)
   A47J 37/00 (2006.01)
   F27D 11/02 (2006.01)
(52) U.S. Cl. ............... 219/433; 219/386; 219/398
(58) Field of Classification Search ............ 279/385, 279/386, 395–398, 414, 417, 429, 432, 433, 279/435
See application file for complete search history.

(56) References Cited

U.S. PATENT DOCUMENTS

| 2,187,888 | A | | 1/1940 | Nachumsohn | 219/35 |
|---|---|---|---|---|---|
| 2,265,295 | A | | 12/1941 | Layton | 219/44 |
| 2,292,854 | A | | 8/1942 | Wilcox | 219/44 |
| 3,243,576 | A | * | 3/1966 | Lee et al. | 219/386 |
| 3,393,295 | A | | 7/1968 | Jepson et al. | 219/398 |
| 3,850,331 | A | * | 11/1974 | Oxel | 220/832 |
| 4,024,377 | A | | 5/1977 | Henke | 219/439 |
| 4,591,698 | A | * | 5/1986 | Chang | 219/400 |
| 5,526,734 | A | * | 6/1996 | Harrison | 99/339 |
| 6,170,388 | B1 | | 1/2001 | Shovick | 99/331 |

\* cited by examiner

Primary Examiner—Joseph Pelham
(74) Attorney, Agent, or Firm—Clifford F. Rey

(57) ABSTRACT

A roasting oven having a large capacity heating well including a wrap-around heating element for heating the side walls thereof and a top heating element for browning is disclosed. A function control panel featuring a touch-film interface and digital display of cooking modes is provided for the user's convenience. In an alternative embodiments standard electromechanical switches and rheostatic temperature controls provide the functions of the present oven. The heating elements are also fabricated in alternative embodiments to provide single-sided or double-sided configurations for particular heating applications. A lid member including the top heating element is attached to the present oven by electrically conductive supporting structures, which incorporate the electrical circuit for the top heating element and also provide for convenient disconnection thereof for cleaning and storage.

19 Claims, 27 Drawing Sheets

ROASTING OVEN WITH DUAL HEATING ELEMENTS

CROSS-REFERENCE TO RELATED APPLICATIONS

This application is a continuation-in-part of U.S. patent application Ser. No. 10/302,202 entitled Roasting Oven with Dual Heating Elements filed Nov. 22, 2002 now U.S. Pat. No. 6,686,569, which is a continuation-in-part of U.S. patent application Ser. No. 09/971,286, now U.S. Pat. No. 6,509,550 entitled Roasting Oven with Dual Heating Elements filed Oct. 5, 2001 and claims the benefits provided under 35 USC § 120.

BACKGROUND OF INVENTION

The present invention relates to cooking appliances and, more particularly, to a large capacity, roasting oven having a wrap-around type heating element for applying heat to the cooking vessel and a top heater element for browning.

Electric cooking pots for preparing and serving hot foods are well known to those skilled in the art. Such electric cooking pots typically include a heating element arranged in functional relation underneath the bottom surface of the cooking well for supplying heat. Such cooking wells are often constructed of stainless steel or enameled steel for reasons of durability and sanitation. However, it is known that both stainless steel and enameled steel have relatively low coefficients of heat conductivity as compared with other metals.

This presents a particular problem for cooking vessels of large capacity (i.e. up to 26 quarts). Applying heat only to the bottom surface of such a large capacity cooking vessel, especially when constructed of stainless steel or enameled steel can result in the upper portion of the cooking vessel being insufficiently heated. Thus, the food in the upper portion of the cooking vessel may become too cool for serving purposes due to the loss of heat in combination with the low rate of heat conductivity and the slow rate at which heat is supplied to the upper portion of the cooking vessel.

The heat distribution problem is compounded in a roasting oven of large capacity and cannot be resolved by simply increasing the power output of the heating element. This is due to the fact that the increased heater output tends to overheat and to cause malfunction of the temperature control components and electronic circuitry, which are typically contained within the oven housing. Thus, the present roasting oven including a food serving system has been developed to solve these problems and other shortcomings of the prior art.

DESCRIPTION OF THE PRIOR ART

One example of a prior art deep well cooker is disclosed in U.S. Pat. No. 4,024,377 to Henke comprising a heat sink preferably formed of aluminum or another corrosion resistant metal having a relatively high coefficient of heat conductivity, which is positioned over the deep well member from below. The heat sink member is generally U-shaped and has a bottom part parallel to and spaced from the bottom of the well member and side parts parallel to and engaging the sides of the well member in heat exchanging relation. An electric heating element is disposed in the space between the bottom of the well member and the bottom part of the U-shaped heat sink member. When the electric heater is energized, heat is supplied to the bottom of the well member by direct radiation and by radiation from the bottom part of the U-shaped member and by convection due to the air in the space occupied by the heating element. Simultaneously, however, heat also flows from the bottom part of the U-shaped member, up side parts of the U-shaped member, and into the sides of the well member. The heat supplied by conduction to the sides of the well member provides for more uniform heating of the well member while also providing for more efficient utilization of the energy supplied to the heating element. However, this device is designed for use with a deep well cooker having a capacity of approximately 8–12 quarts based on the dimensions provided in the specifications. This device necessarily becomes less efficient when applied to a larger capacity cooker having increased side wall dimensions.

Another example of a prior art cooking device having multiple heating elements is disclosed in U.S. Pat. No. 3,393,295 to Jepson et. al. comprising a pan with a lower electric heating element supported on its underside and a deep cover with an upper heating element supported within. A thermostatic control is connected to the lower heating element for energization thereof. When the cover is closed, an electrical connection for energizing the upper heating element is completed. The control serves thermostatically to control the energization of either element in a repeating, alternating sequence and is capable of performing the functions of a frying pan, broiler, and oven. However, this invention is not directly applicable to deep well cookers nor does it disclose a wrap-around heating element for controlling heat distribution to the upper surfaces of a deep well member within such a cooker.

U.S. Pat. Nos. 2,265,295 to Layton; U.S. Pat. No. 6,170,388 to Shovick; U.S. Pat. No. 2,292,854 to Wilcox; U.S. Pat. No. 2,187,888 to Nachumsohn; and German Patent document 3606800 to Rederer disclose heating/cooking devices, which are cited in the Form PTO-892 as references in the parent case (application Ser. No. 09/971,286) and are pertinent to applicant's disclosure in the present application.

Thus, the present invention has been developed to provide various solutions to the problem of regulating the distribution of heat to all surfaces within a deep well cooker having a large capacity up to 26 quarts.

SUMMARY OF THE INVENTION

Accordingly, the present invention provides an roasting oven having a large capacity (i.e. up to 26 quarts) that includes a wrap-around heating element, which is disposed about the heating well for heating the sides thereof and a top heating element for browning (i.e. to scorch slightly in cooking) mounted within the oven lid.

Both the wrap-around heating element and the top heating element are provided in alternative embodiments utilizing different types of heating elements and power sources for versatility in manufacturing and heating. The wrap-around heating element and the top heating element are interconnected by temperature controls for heat regulation and a function control switch for selectively energizing the desired heating elements individually or in combination.

For convenience the roasting oven lid containing the top heating element is removable being provided with detachable electrical connectors, which form a portion of the electrical circuit for the top heating element. The present roasting oven also includes serving containers for maintaining the cooked food in ready-to-eat condition and for reheating leftover food items.

In various alternative embodiments of the roasting oven, the top heating element and the wrap-around heating element are provided with separate power supply circuits for independent operation.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures wherein:

DETAILED DESCRIPTION OF THE PREFERRED EMBODIMENTS

Figure 1A:
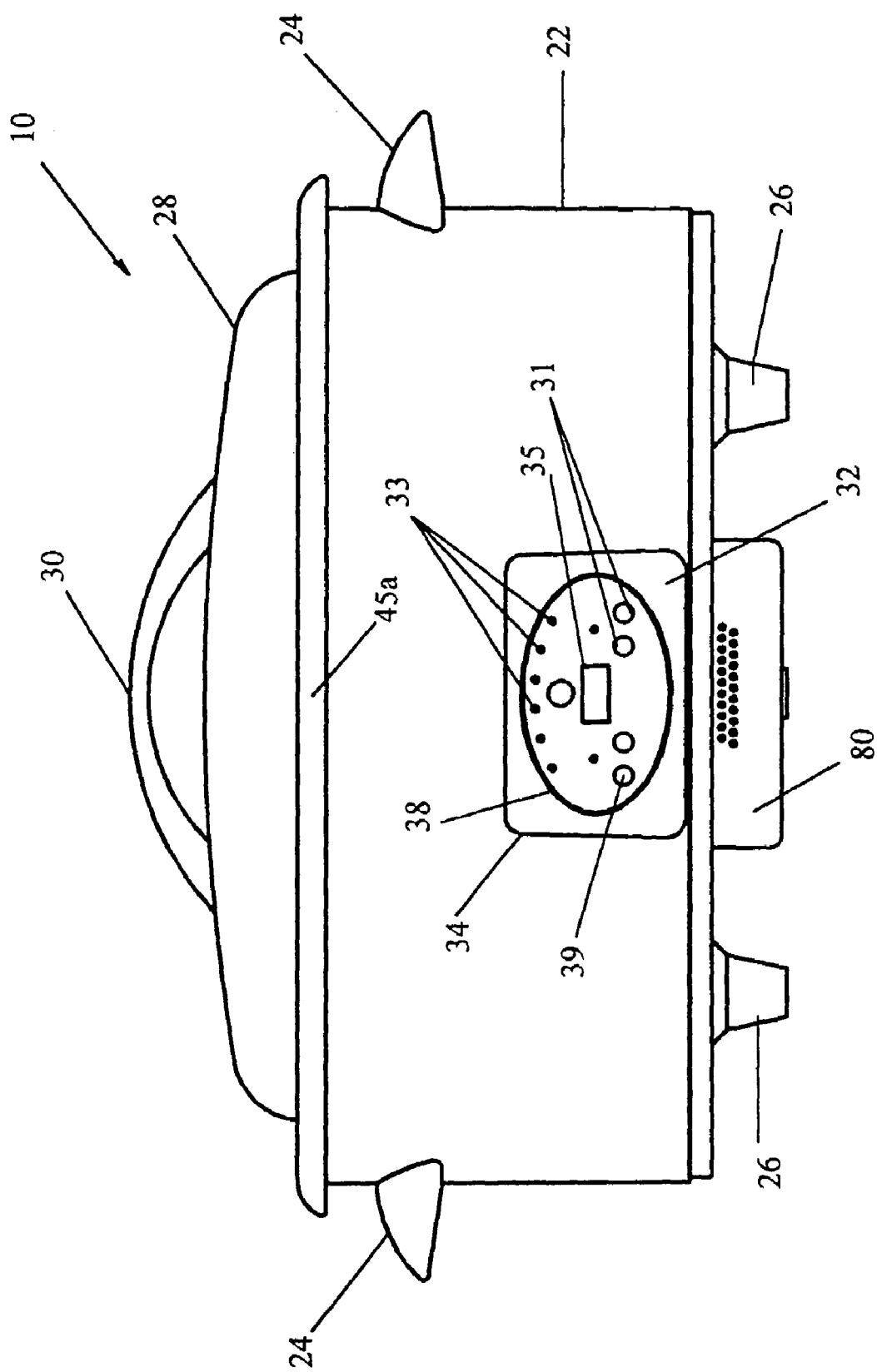
FIG. 1A is a front elevational view of the roasting oven of the present invention.

With further reference to the drawings, there is shown therein an embodiment of a roasting oven in accordance with the present invention, indicated generally at 10, and illustrated in FIG. 1A. The present roasting oven 10 is comprised of an outer housing 22 equipped with fixed external handles 24 and feet 26. The roasting oven 10 is also provided with a lid 28 equipped with a handle 30.

Figure 1B:
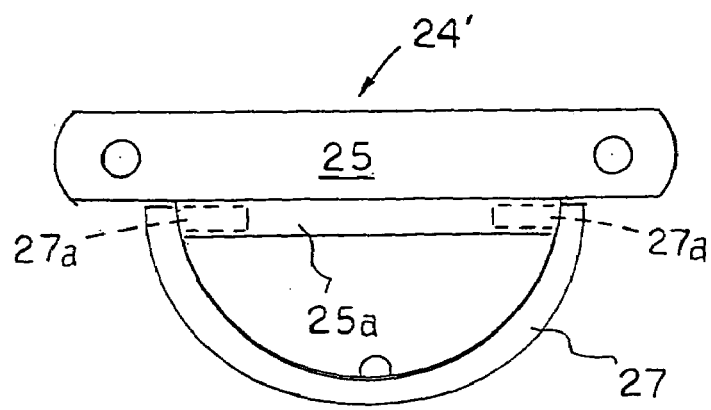
FIG. 1B is an elevational view of the folding handle assembly of an alternative embodiment the present invention.
Figure 1C:
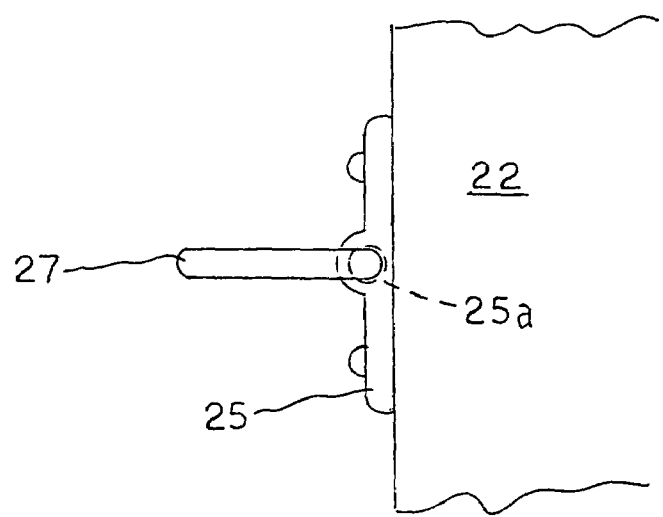
FIG. 1C is a side view of the handle assembly of FIG. 1B showing the handle member in a raised position.

In an alternative embodiment the roasting oven 10 is provided with folding handle assemblies, indicated generally at 24', as shown in FIGS. 1B and 1C. Each handle assembly 24' includes a mounting plate 25 conforming to the exterior contour of the housing 22. Mounting plates 25 include a horizontally disposed groove 25a formed along the breadth thereof, which is configured to receive a generally D-shaped handle member 27. The handle member 27 includes shank portions 27a (shown in broken outline) which engage the groove 25a to impart pivoting movement to the handle member 27 as shown in FIG. 1C. Handle members 27 are designed to temporarily lock in the extended position shown in FIG. 1C. Thereafter, handle members 27 pivot downwardly to the position shown in FIG. 1A for convenient storage. This provides space savings for display on store shelves and cost savings on shipping carton size.

In the preferred embodiment the housing 22 is constructed of sheet steel, heat resistant plastic, or other suitable material and is provided in different exterior finishes such as powder coating, stainless steel, or plated steel.

Figure 2A:
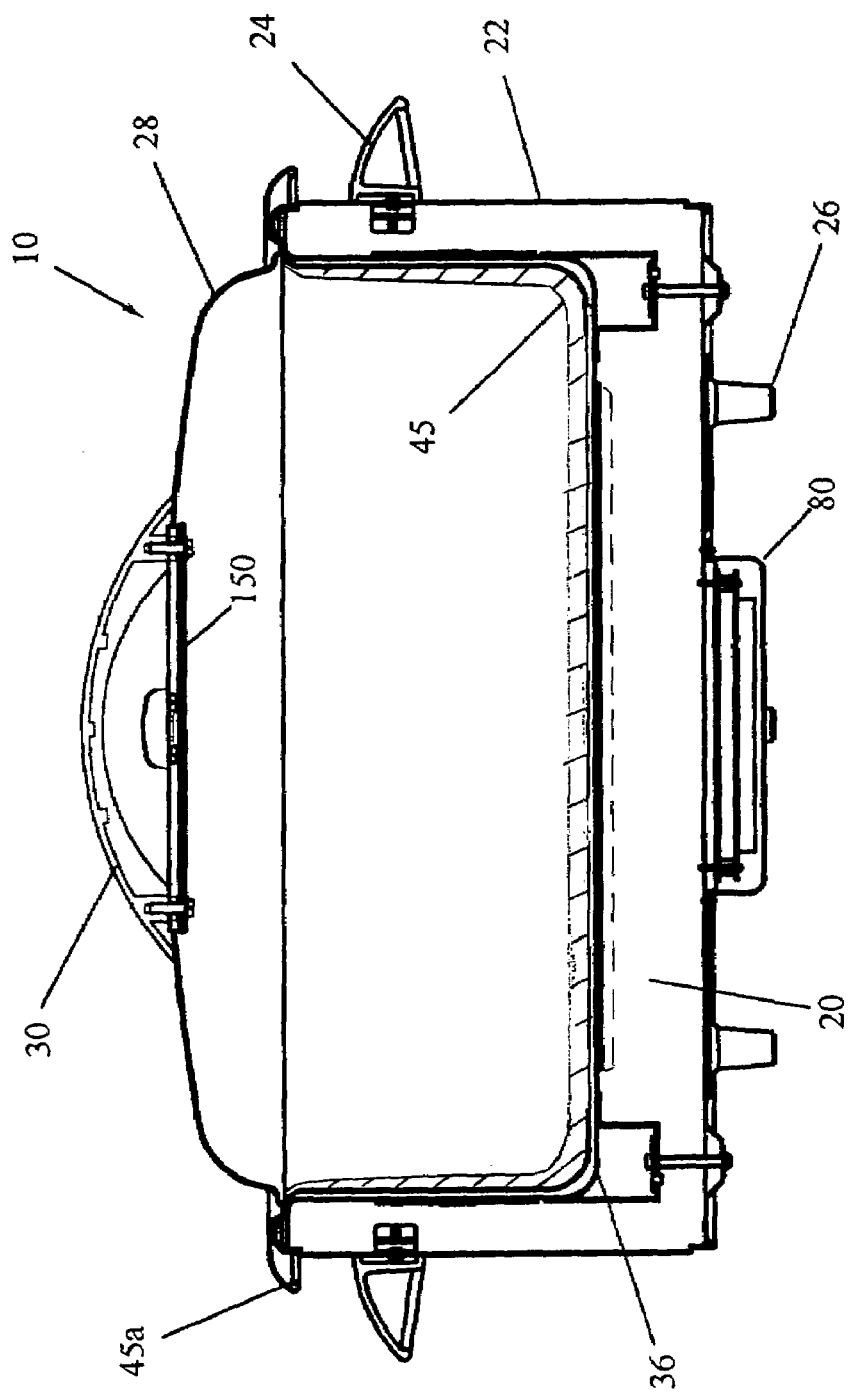
FIG. 2A is a longitudinal cross-section of the roasting oven showing details of the construction thereof.
Figure 2B:
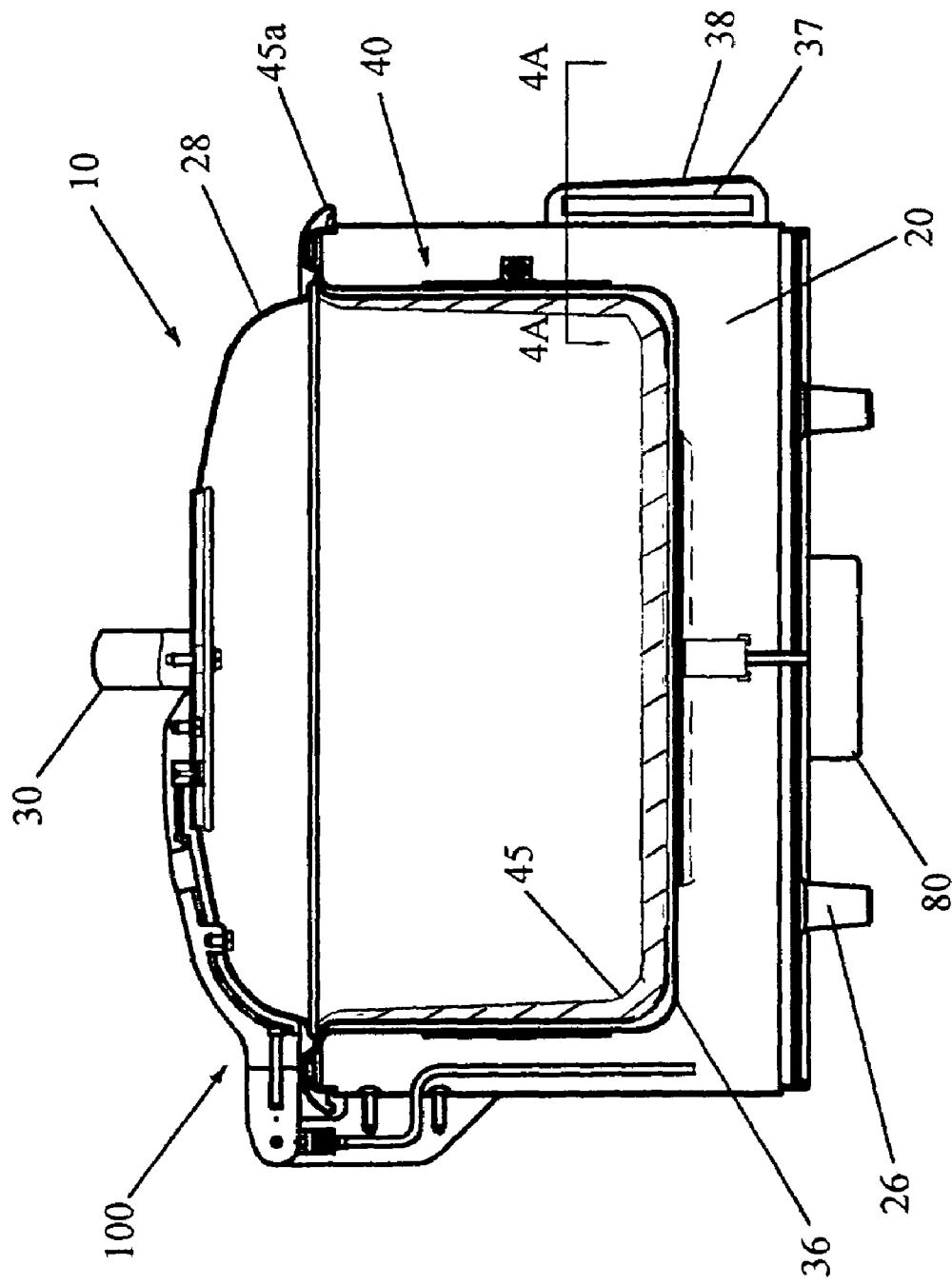
FIG. 2B is a transverse cross-section of the roasting oven showing further details thereof including the hinge mechanism.

The present roasting oven 10 also includes an internal heating well 36 disposed within the housing 22 as more clearly shown in FIGS. 2A and 2B. The heating well 36 is constructed of enamel-coated steel cast aluminum, cast iron or other suitable material. The present oven 10 features a wrap-around heating element, indicated generally at 40, and a top heating element, indicated generally at 150, as described hereinafter in further detail.

The present roasting oven 10 also includes a removable cooking liner 45 including a peripheral flange member 45a which is seated on the upper edge of the housing 22 as shown. The liner 45 is also constructed of stainless steel, enamel-coated steel, cast aluminum or other suitable material. The cooking liner 45 is easily removed from the heating well 36 for cleaning for the convenience of the user.

A layer of heat-resistant insulating material (not shown) is disposed in the air space as at 20 between the housing 22 and the cooking well 36 as shown in FIGS. 2A and 2B. Numerous types of heat insulating materials having physical and chemical properties suitable for this application are commercially available. Since such heat insulating materials are well known to those skilled in the art, further detailed discussion of the same is not deemed necessary.

Figure 3:
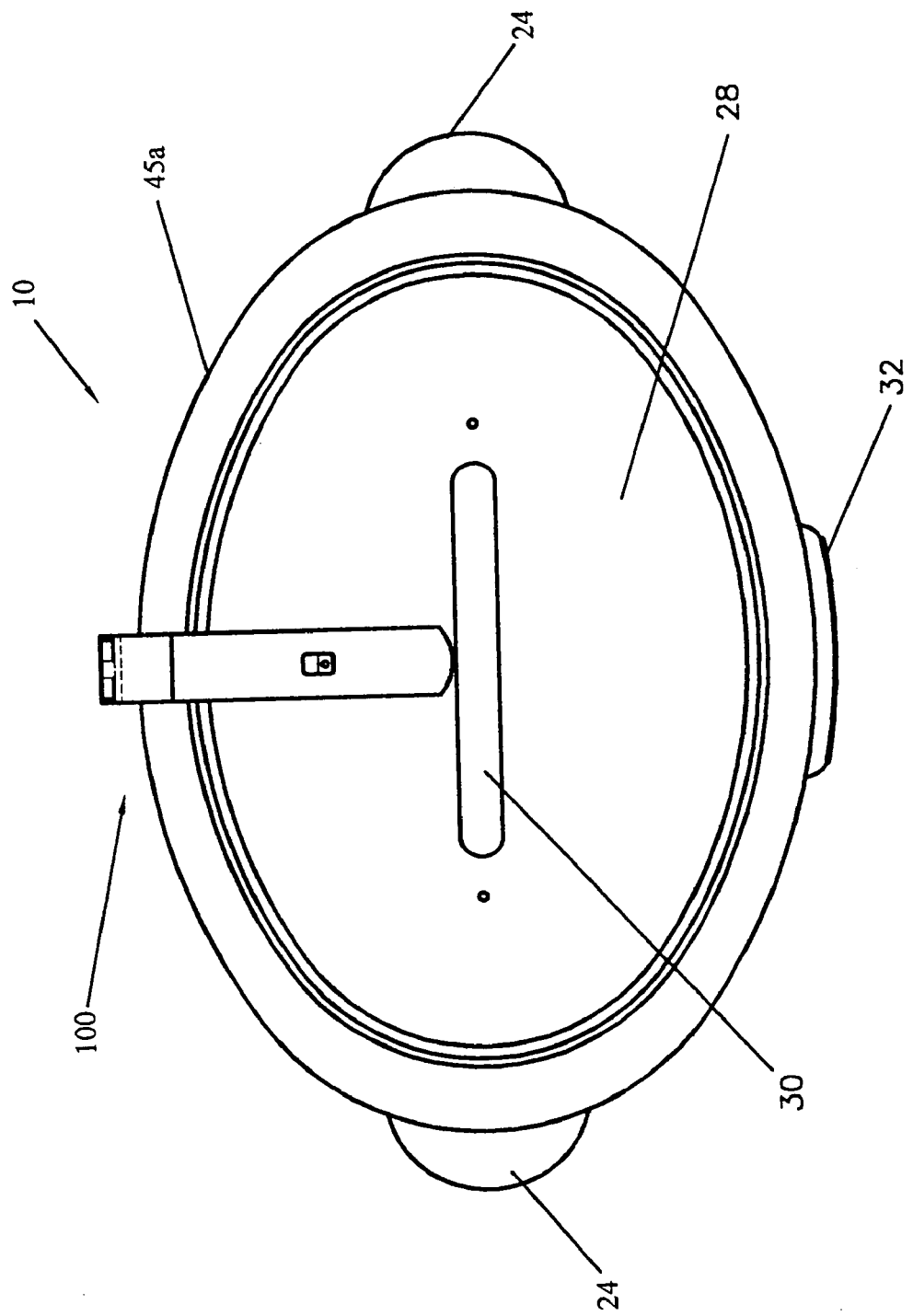
FIG. 3 is a top plan view of the roasting oven of the present invention.

Referring to an embodiment illustrated in FIG. 3, the present roasting oven 10 is oval-shaped in configuration. It has been determined that optimal heating of the side wall surfaces of the large capacity (i.e. up to 26 quarts) heating well 36 can be achieved at all times in the oval configuration. However, it will be appreciated that the roasting oven 10 may be constructed in a circular, square, or rectangular configurations with minor modifications to the heating elements.

Referring again to FIG. 1, a control panel, indicated generally at 32, is provided on the lower front surface of the housing 22 to carry out the functions of the present roasting oven 10. The control panel 32 includes a plurality of temperature control switches 33 which are electrically interconnected with both the wrap-around and top heating elements 40, 150 and serve to regulate the operation thereof. The control panel 32 also includes a digital display 35, cooking mode switches 31, and a power switch 39.

In the embodiment shown the control panel 32 is comprised of a heat-resistant housing 34 including a flexible, push button film 38 which overlays an electronic control circuit board 37 (FIG. 2B) that provides the user with fingertip control of the cooking functions. A key innovation of the present oven 10 is a ventilated compartment 80 wherein the power supply circuit board 81 (FIG. 10) is protected from the heat source as explained hereinafter in further detail.

Figure 4A:
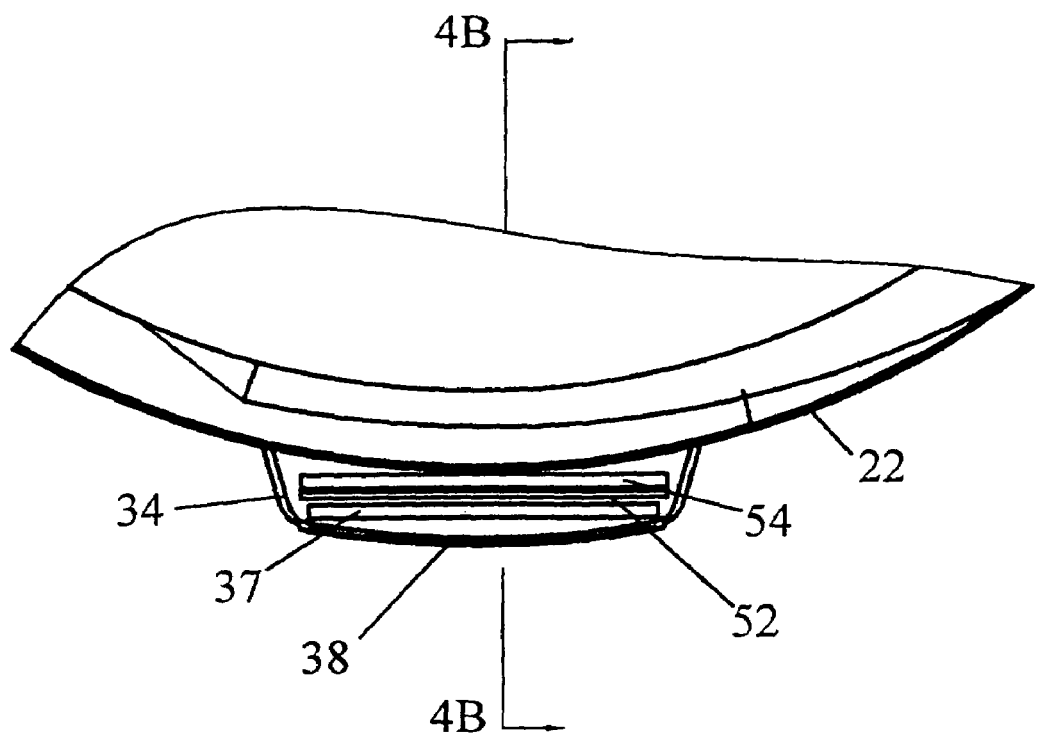
FIG. 4A is a partial horizontal section view taken along the section line 4A—4A of FIG. 2B showing the construction of the temperature control panel.
Figure 4B:
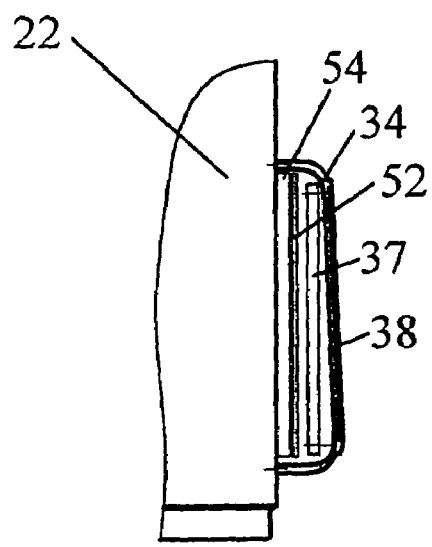
FIG. 4B is a partial vertical section view taken along the section line 4B—4B of FIG. 4A showing the construction of the temperature control panel.

As more clearly shown in FIGS. 4A and 4B the electronic control circuit board 37 is insulated from the wrap-around heating element 40, which is disposed around the outer circumference of the heating well 36, by layers of mica sheet insulation board installed as at 52 and/or other suitable heat insulating material installed as at 54 adjacent the exterior of the housing 22.

Figure 5A:
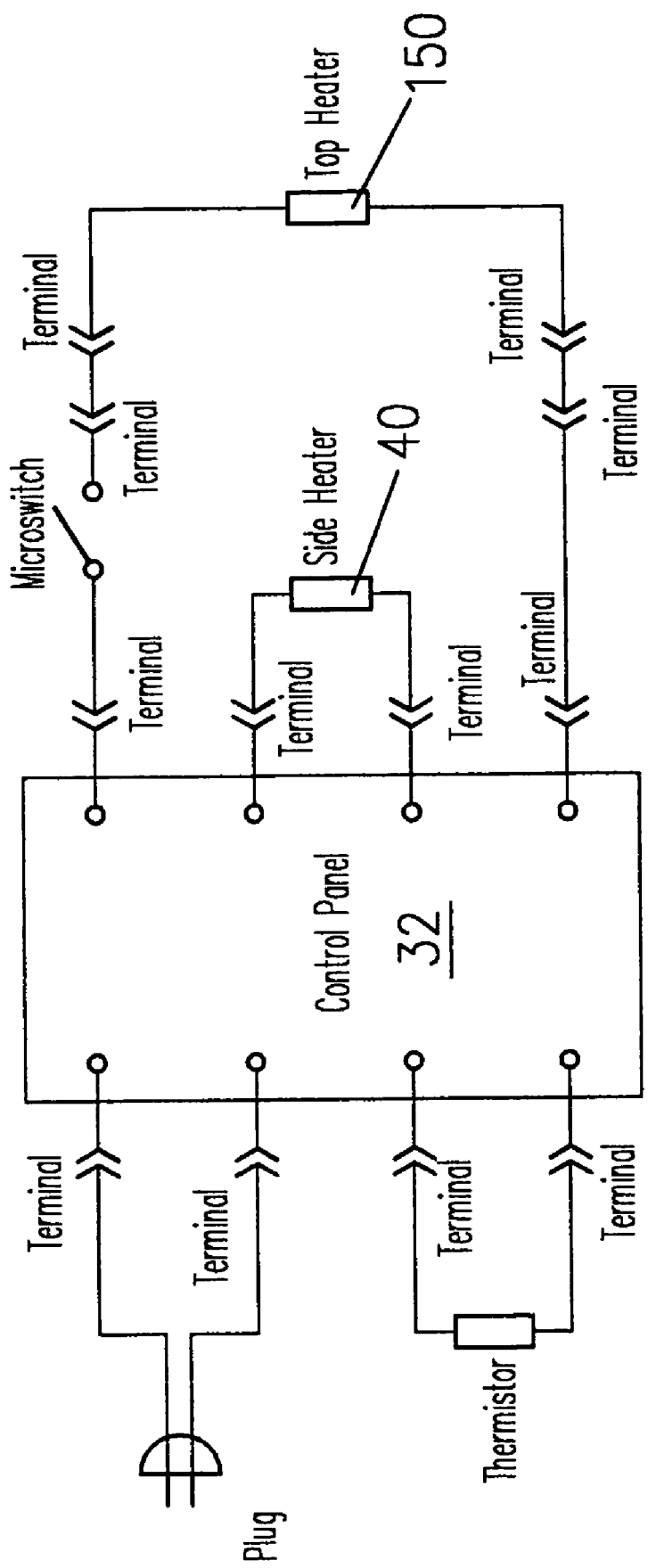
FIG. 5A is a schematic diagram representing the circuitry of the present roasting oven wherein an electronic control panel is utilized.
Figure 5B:
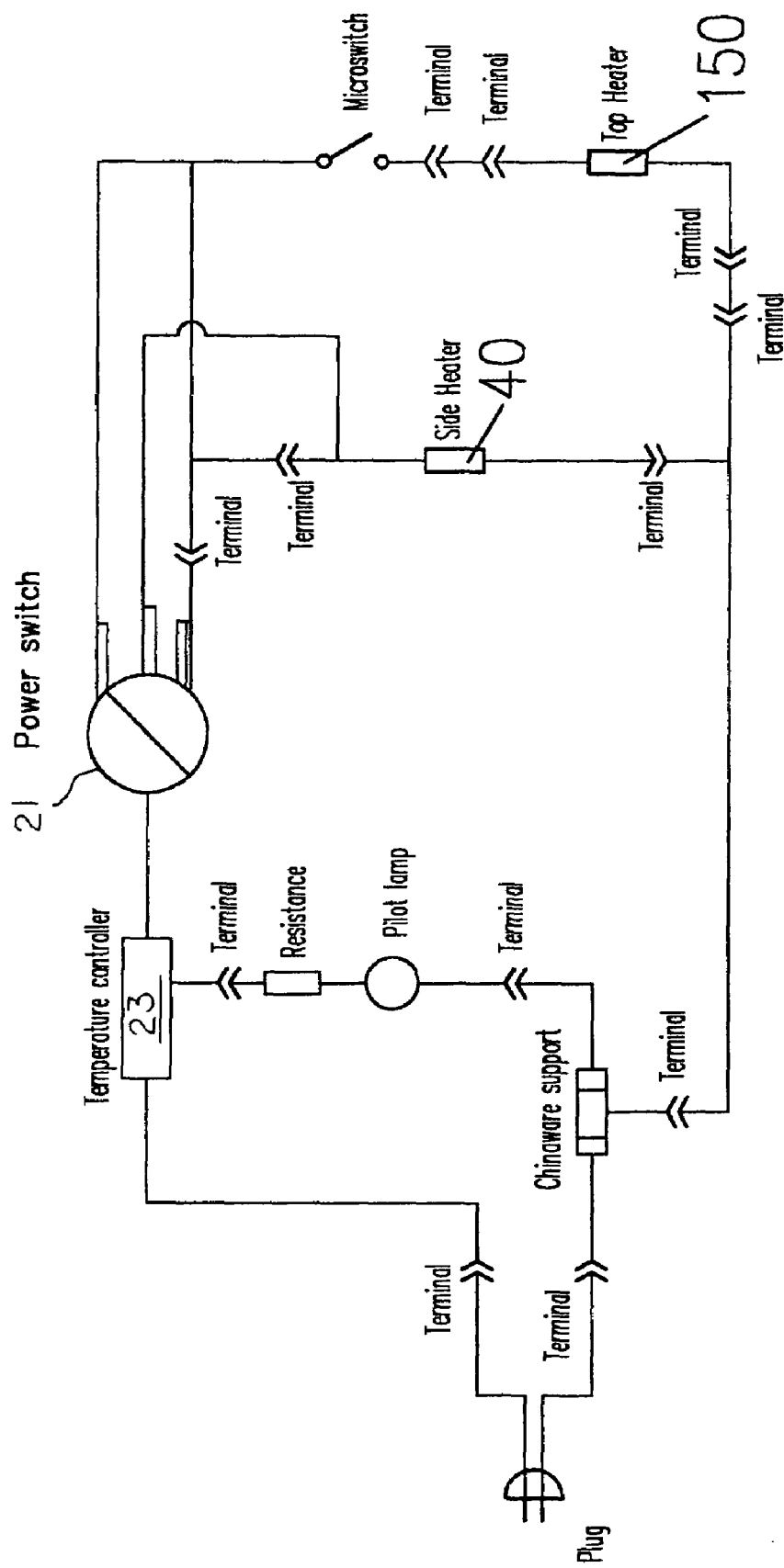
FIG. 5B is a schematic diagram representing an alternative embodiment of the circuitry wherein electromechanical switches and rheostatic temperature controls are utilized.

Referring now to FIGS. 5A and 5B, there are shown schematic representations of alternative embodiments of the present roasting oven 10. It will be appreciated by those skilled in the art that the electrical functions may be carried out by the electronic control panel 32 as shown in FIG. 5A or, in the alternative, by the use of standard electromechanical switches and rheostatic temperature control devices shown in FIG. 5B.

The present roasting oven 10 is designed for use with standard household electrical systems. In the preferred embodiment the wrap-around heating element 40 is designed to operate in the range of 1000–1500 watts and the top heating element 150 to operate in the range of 25 to 150 watts. This wattage rating varies for a given application and capacity of the oven.

Figure 6A:
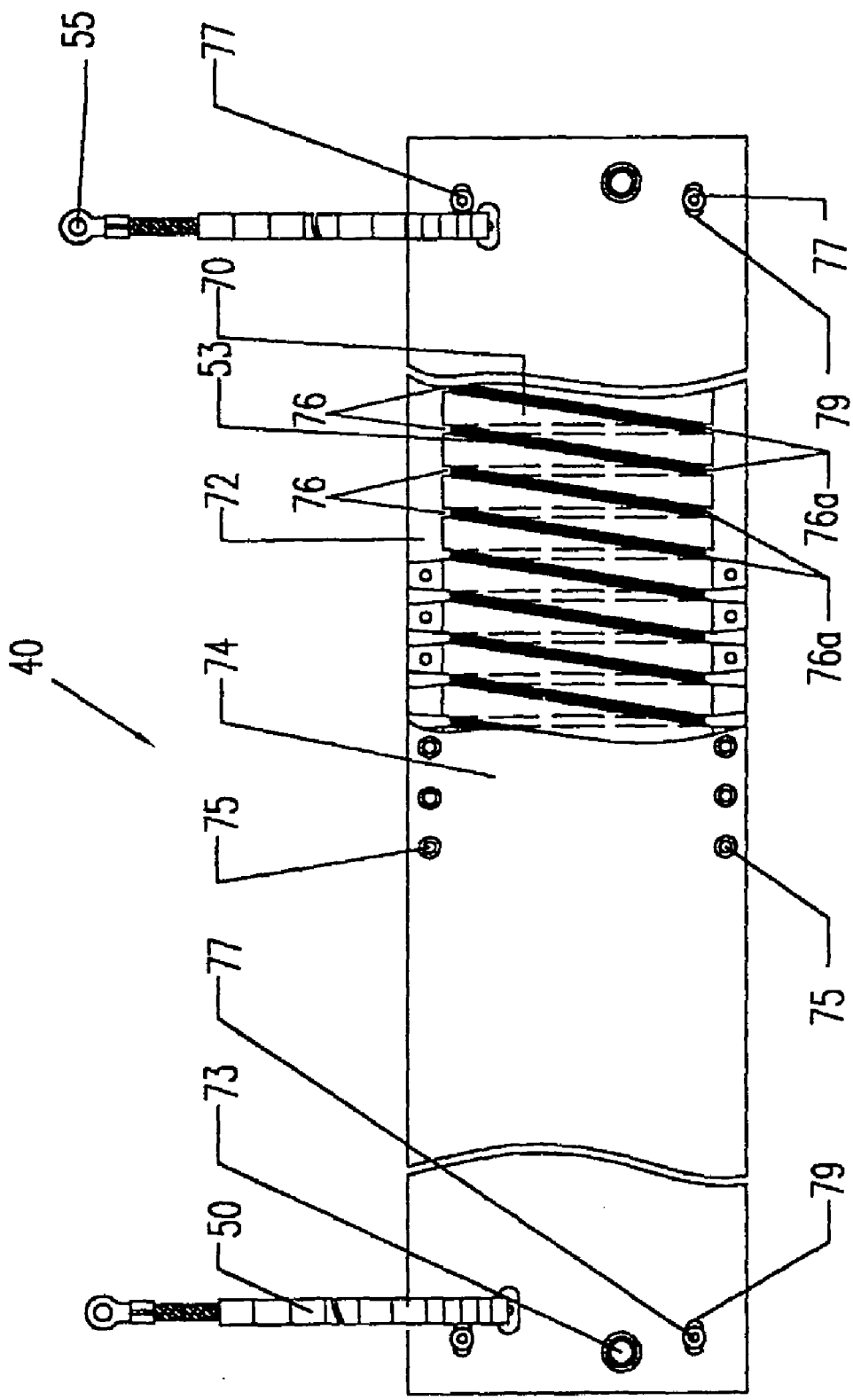
FIG. 6A is a partially cutaway elevational view showing the details of the construction of the heating elements in a double-sided configuration.
Figure 6B:
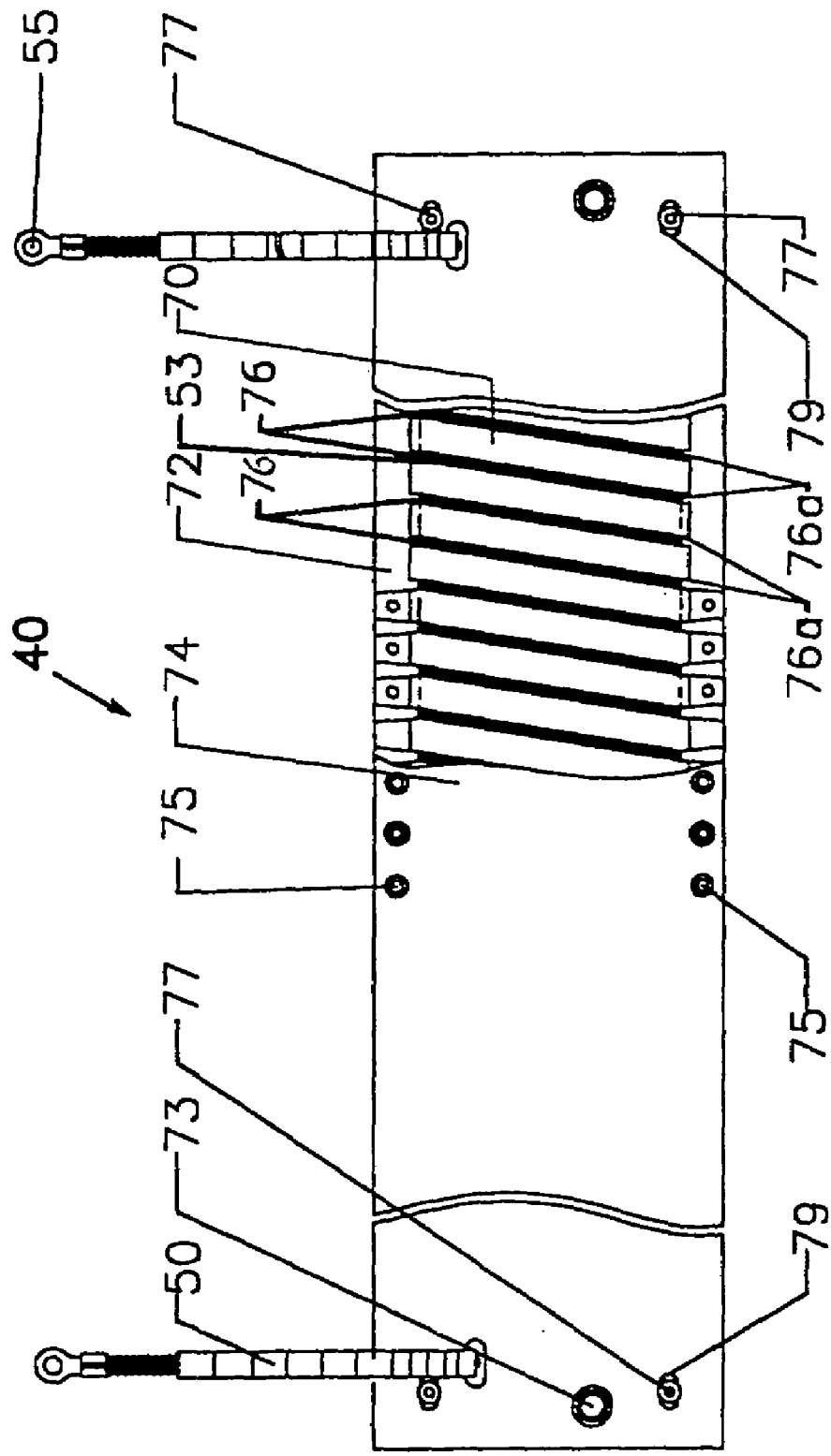
FIG. 6B is a partially cutaway elevational view showing the details of the construction of the heating elements in a single-sided configuration.
Figure 6C:
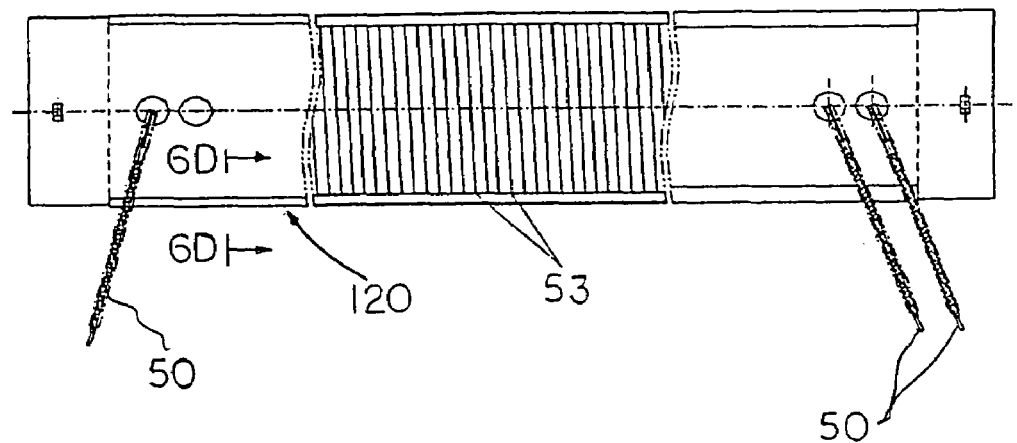
FIG. 6C is a partially cutaway elevational view of an alternative embodiment of the wrap-around heating element.
Figure 6D:
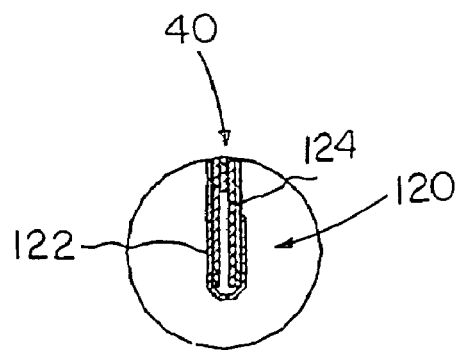
FIG. 6D is a sectional view taken along line 6D—6D of FIG. 6C showing details thereof.

With reference to FIGS. 6A and 6B, the present invention provides structures which comprise heating means including, but not limited to, the following structures. In one embodiment both the wrap-around heating element 40 and the top heating element 150 are constructed as layered assemblies wherein a sheet of heat insulating material, indicated generally at 70, such as mica insulation board is interposed between interior and exterior sheets 72, 74 of similar heat insulating material. Since the physical and chemical properties of mica insulation board and other similar heat insulating materials are well known to those skilled in the art, further detailed discussion of this material is not deemed necessary.

Still referring to FIGS. 6A and 6B, it will be noted that the sheet of heat insulating material 70 is fabricated with a plurality of die-cut notches 76 and 76a, which are formed at predetermined intervals along the opposite lateral edges thereof Using a construction method of the present invention, the heater wire 53 is drawn across a pair of diagonally opposed notches as at 76 and 76a, wrapped in continuous revolutions around the heat insulating sheet 70, and advanced in this manner along the entire length thereof as shown by directional arrows. It will be appreciated that using the aforementioned technique produces a so-called double-sided heating element (FIG. 6A) having heating wire 53 disposed on both sides thereof.

Using an alternative construction technique shown in FIG. 6B, a single-sided heating element can be produced by initially drawing the heater wire 53 across the heat insulating sheet 70 as described in the first step hereinabove. Next, the wire 53 is interlaced between adjacent notches 76 on the same lateral edge of the heat insulating sheet 70 as shown by directional arrows. Thereafter, the wire 53 is again drawn across the sheet 70 to the next diagonally opposed notch 76a on the opposite lateral edge thereof Next, the wire 53 is interlaced between adjacent notches 76a on the opposite lateral edge of the heat insulating sheet 70.

In this manner, it will be understood that a single-sided heater element having at least 75% of the total amount of heater wire 53 used in its construction disposed on one surface of the sheet 70 may be produced. Such a single-sided heating element (FIG. 6B) is advantageous in reducing the radially outward reflection of heat generated by the heating elements thereby improving heating efficiency and providing a cooler outer surface in the event of user contact for safety purposes.

In both of the above described embodiments, the sheet 70 is permanently captured between the interior and exterior sheets 72 and 74, and secured at periodic intervals as shown by rivets 75 or other suitable fasteners to maintain alignment of the individual layers.

Various alternative materials and techniques may be employed in the fabrication of the heating elements as shown in FIGS. 6C to 6G. For example, in FIGS. 6C and 6D the wrap-around heating element 40 as described above is enclosed in a metallic sheath, indicated generally at 120. Sheath 120 is comprised of inner and outer layers 122, 124 respectively of light gauge sheet metal such as aluminum or galvanized steel, or a combination thereof, which is folded about the heating element 40 (FIG. 6D) to form a protective enclosure.

Figure 6E:
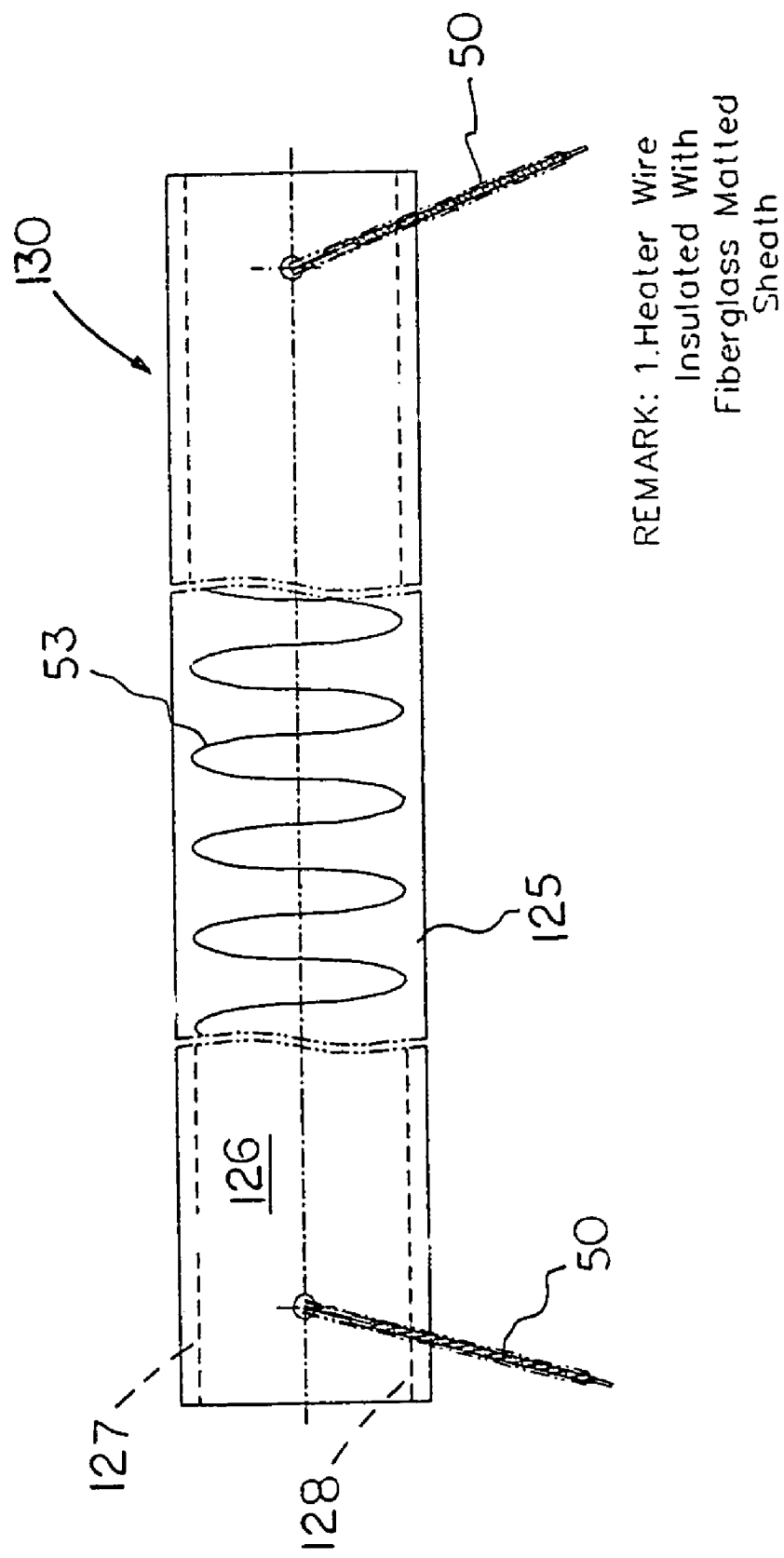
FIG. 6E is a partially cutaway elevational view of another embodiment of the wrap-around heating element.

In another embodiment shown in FIG. 6E the heater wire 53 is provided in a serpentine pattern and permanently captured between opposed layers 125, 126 of a matted fiberglass sheath, indicated generally at 130, having exceptional chemical characteristics for heat resistance. Layers 125, 126 are sewn together along suture lines 127, 128 to form the protective sheath 130 about the heater wire 53.

Figure 6F:
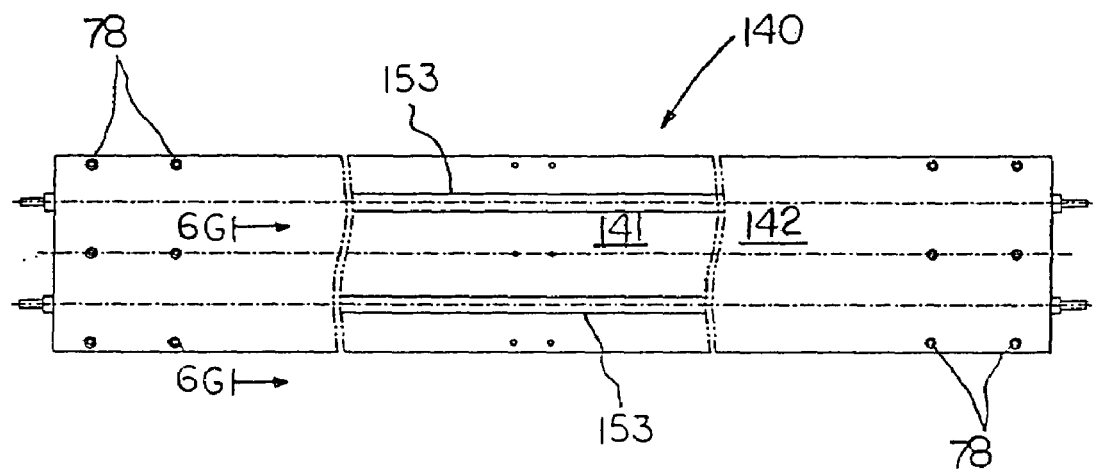
FIG. 6F is a partially cutaway elevational view of another embodiment of the wrap-around heating element.
Figure 6G:
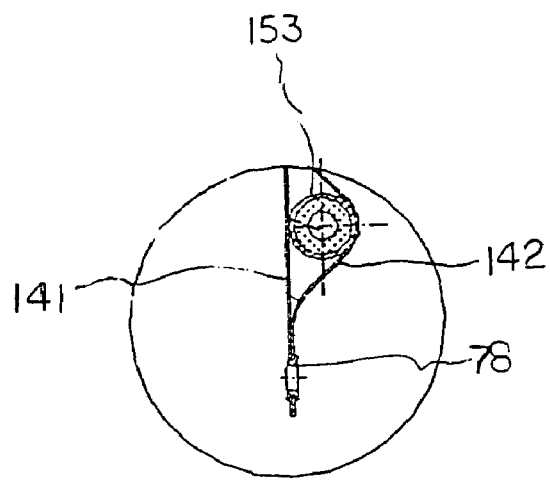
FIG. 6G is a sectional view taken along line 6G—6G of FIG. 6F showing details thereof.

In yet another embodiment shown in FIGS. 6F and 6G, a pair of tubular heating elements 153 are disposed between the opposed layers 141, 142 respectively of a metallic sheath, indicated generally at 140. In this embodiment the opposed layers 141, 142 are fabricated from aluminum sheet material and the tubular heater elements 153 are secured in position by installation of parallel rows of rivets 75 or grommets 78 as shown.

Figure 7A:
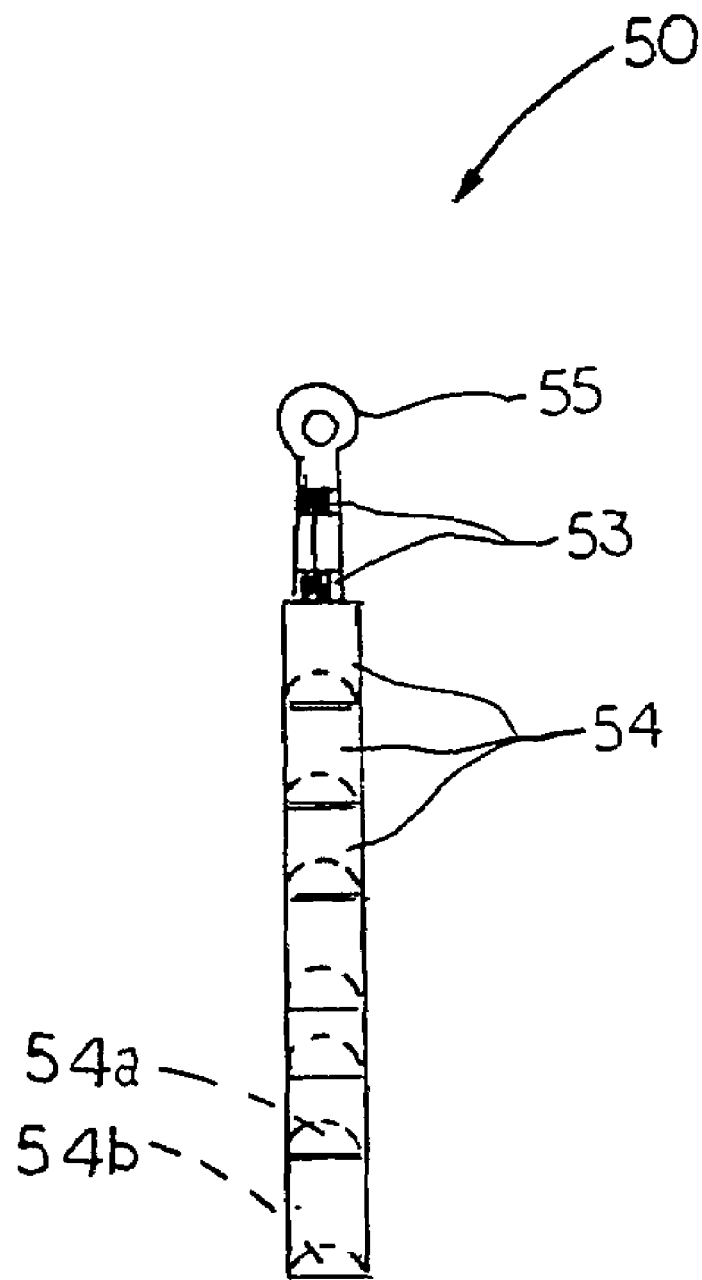
FIG. 7 is a plan view of the wire lead assembly of the heating element of the present invention.

Referring now to FIG. 7A there is shown therein a heater lead wire assembly, indicated generally at 50, for installation on the terminal ends of the heater wire 53. In this embodiment the terminal ends of the heater wire 53 are insulated by a plurality of ceramic sleeves 54 to shield the temperature controls from exposure to heat from the wire 53. It can be seen that each ceramic sleeve 54 includes a convex tip 54a (shown in broken lines) which engages a concave end 54b on the adjacent sleeve to impart flexibility to the wire lead assembly. A terminal loop connector 55 is applied to the end of each heater lead wire assembly 50' as illustrated.

Figure 7B:
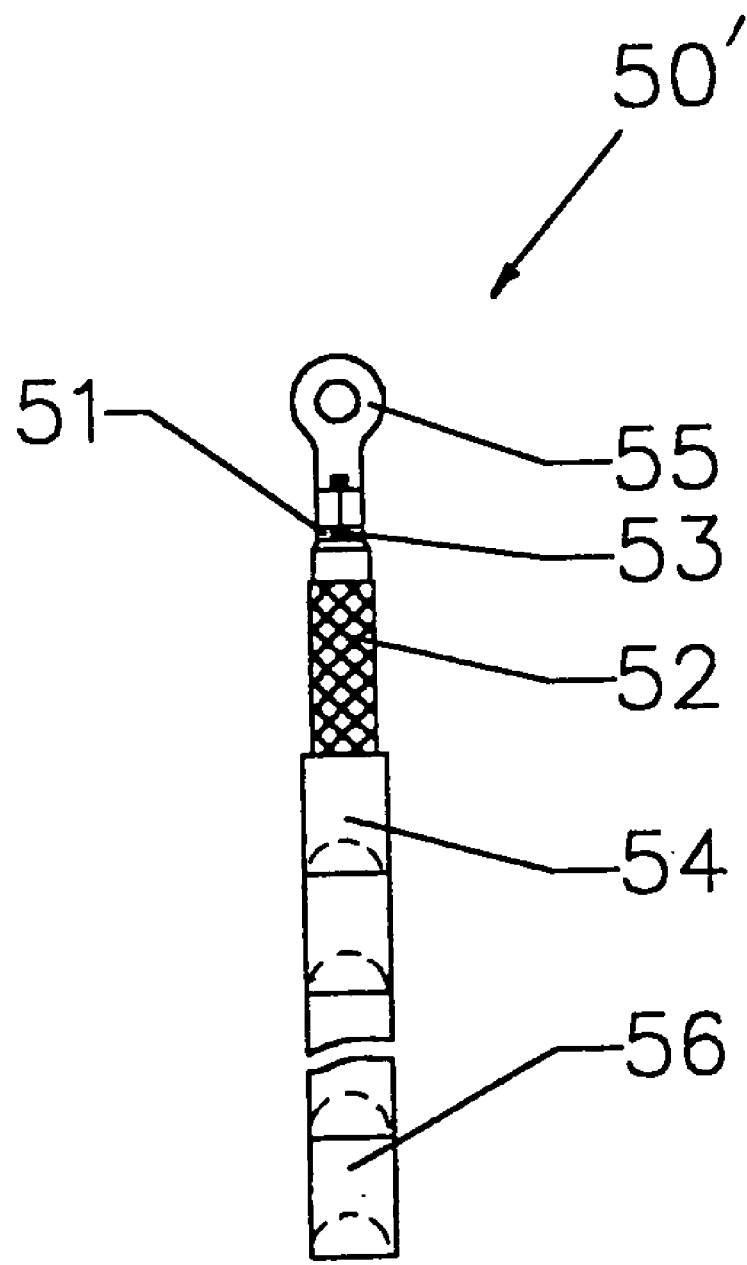

In an alternative construction of the heater lead wire assembly, indicated generally at 50', in FIG. 7B the terminal ends of the heater wire 53 are tightly twisted with a bundle of nickel conductors 51 or other suitable conductors to create a heat sink, which effectively insulates the heater wire 53 from the temperature controls. Further, the twisted bundle of nickel conductors 51 and heater wire 53 is covered with a fiberglass insulation sleeve 52 and insulated by the same ceramic sleeves 54 to insure that the temperature controls are accurate and not influenced by their proximity to the wrap-around heater element 40. A terminal loop connector 55 is applied to the terminal end of the heater lead wire assembly 50' as described hereinabove.

Figure 8A:
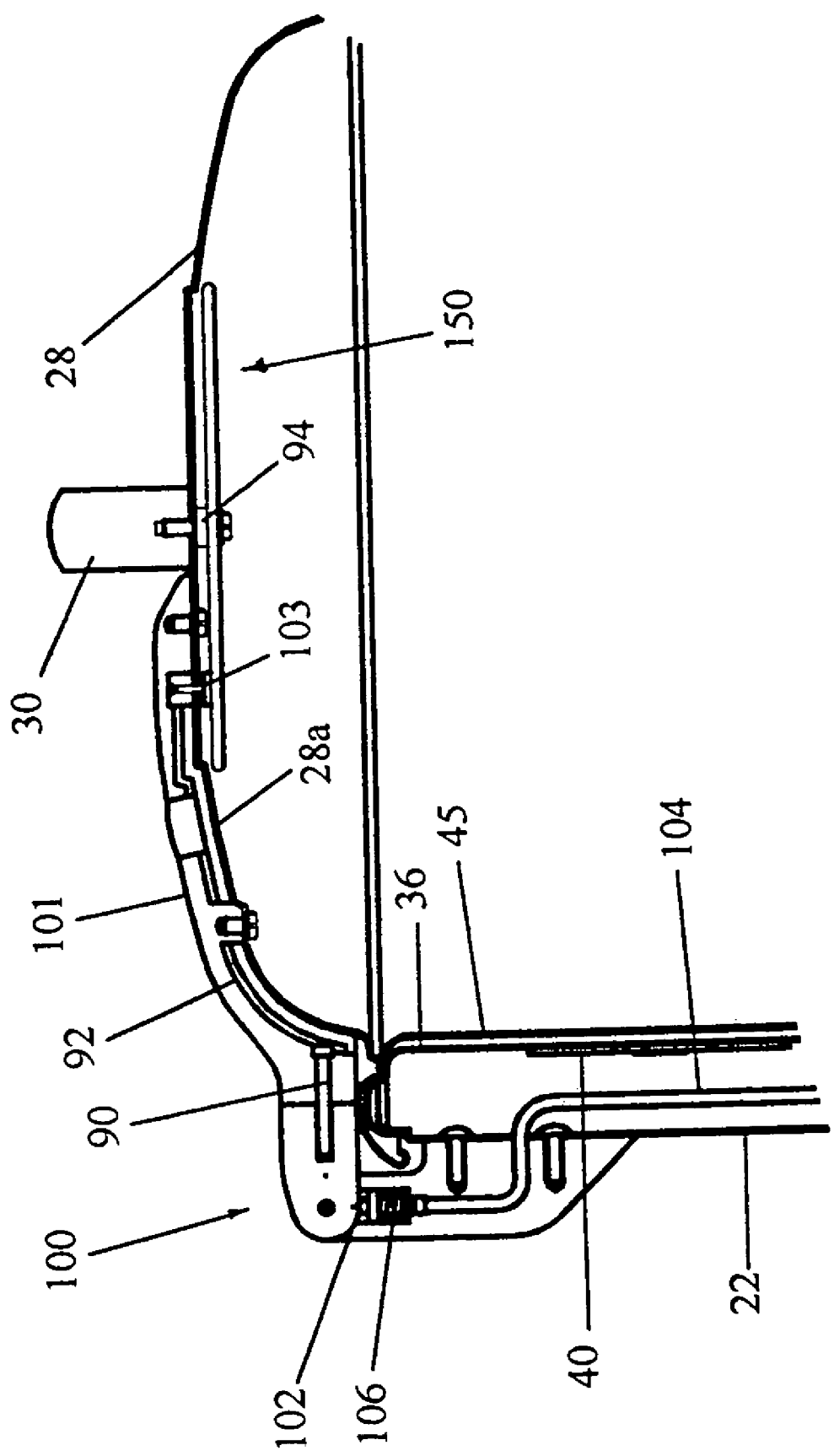
FIG. 8A is a partial cross-section view showing the top heating element within the lid.

In the embodiment shown in FIG. 8A, the top heating element 150 conforms generally to the configuration of the lid 28 and is constructed using the single-sided wire wrapping technique described hereinabove. In the present invention the lid 28 is provided with structures, which comprise electrically conductive supporting means including, but not limited to, the following structures. As shown in FIG. 8A, the top heating element 150 is mounted on the inner surface 28a of the lid 28. The top heating element 150 is electrically connected to the power source by a pin connector 103 attached by electrical wiring (not shown) to an electrical plug assembly 90 within the hinge mechanism 100.

The wiring is disposed within a wire channel 92 formed in the body 101 of the hinge and extends through the hinge mechanism, indicated generally at 100, to a power cord 104, which extends from the housing 22 as shown. An electrical circuit for the top heating element 150 is completed at contact 102 when the hinge mechanism 100 is in the closed position as shown in FIG. 8A. A compression spring 106 maintains the electrical connection when the lid 28 is in the closed position.

Figure 8B:
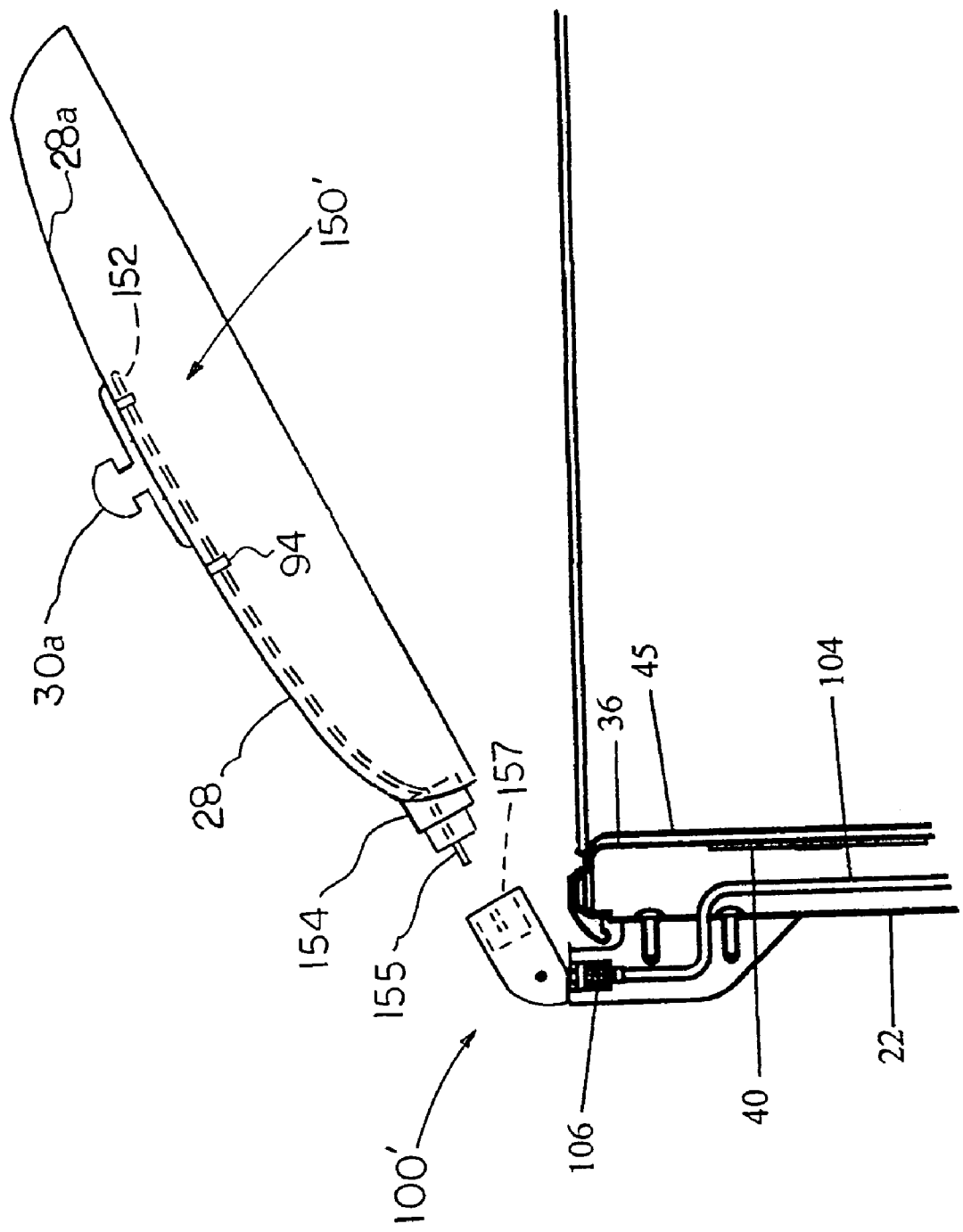
FIG. 8B is an exploded, cross-section view showing an alternative embodiment of the lid including a tubular heating element and detachable plug connectors.

Referring to FIG. 8B there is shown another embodiment of a top heating or browning element 150', which is generally U-shaped in configuration. In this embodiment a tubular type (e.g. Cal-rod) element 152 is mounted on the inner surface 28a of the lid 28 as shown. In this embodiment the lid 28 is fabricated from a heatproof glass material. The browning element 150' extends through the lid 28 within an insulating block 154 and terminates in a plug connector 155. Plug connector 155 is received in an electrical receptacle 157, which is integrated into the modified hinge mechanism 100'. Thus, the top browning element 150' is electrically connected to the power source via power cord 104 within the housing 22. Advantageously, the plug 155 and receptacle 157 may be disconnected for food service, cleaning, and storage purposes.

Figure 8C:
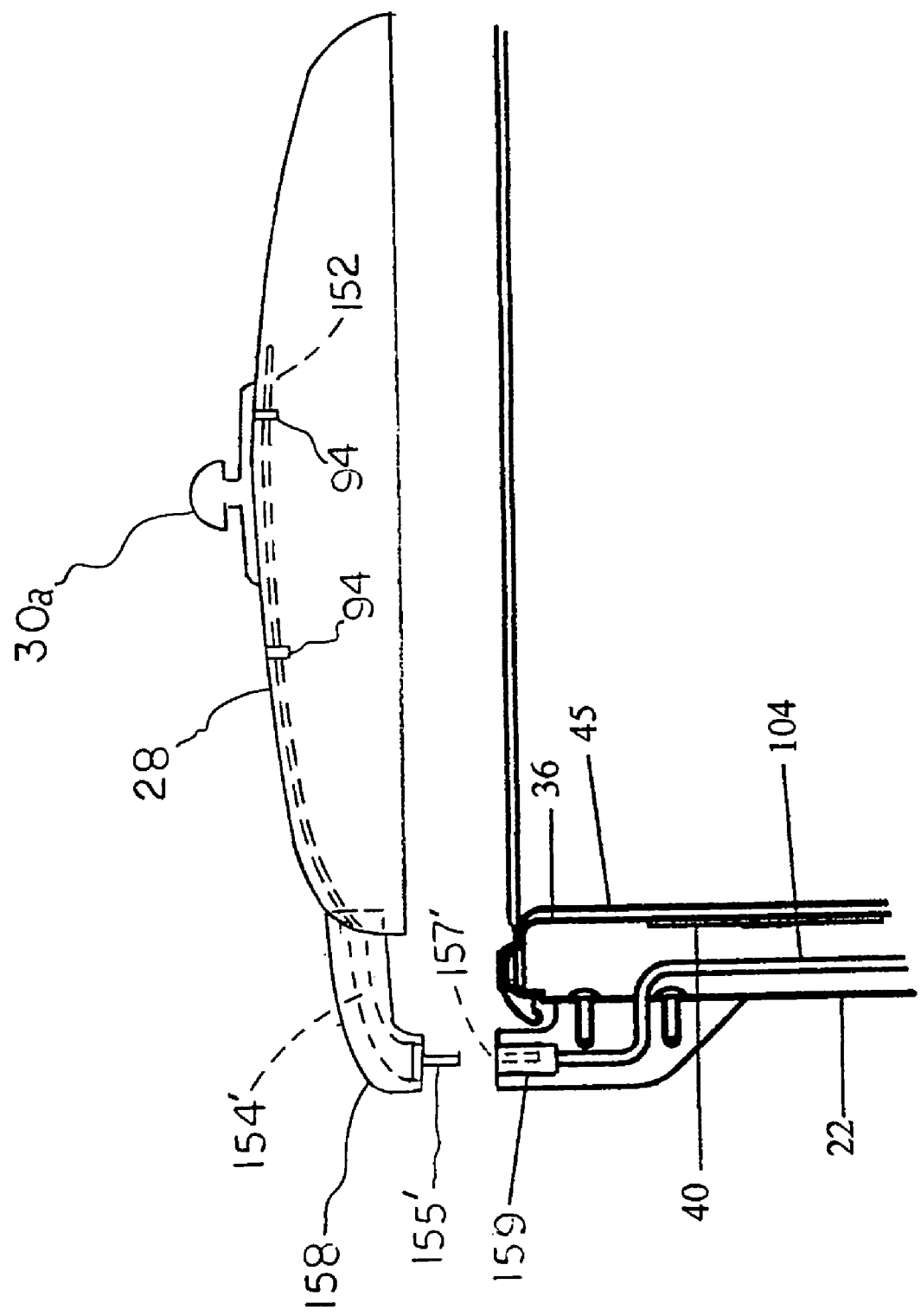
FIG. 8C is a partial cross-section view showing an alternative embodiment of the lid including detachable magnetic connectors.

In another embodiment shown in FIG. 8C a tubular type browning element 150' extends through the lid 28 within a modified insulating block 154' and terminates in a right angle plug connector 155'. A cover 158 encloses the insulating block 154' and the plug connector 155'.

Plug connector 155' is received in an electrical receptacle 157', which includes a permanent magnet block 159. Magnet block 159 engages and retains plug connector 155' at the interface thereof to maintain electrical contact with the top browning element 150' and to secure the lid 28 in position on the oven. The plug connector 155' and receptacle 157' may be conveniently disconnected for food service, cleaning, and storage purposes.

Figure 9:
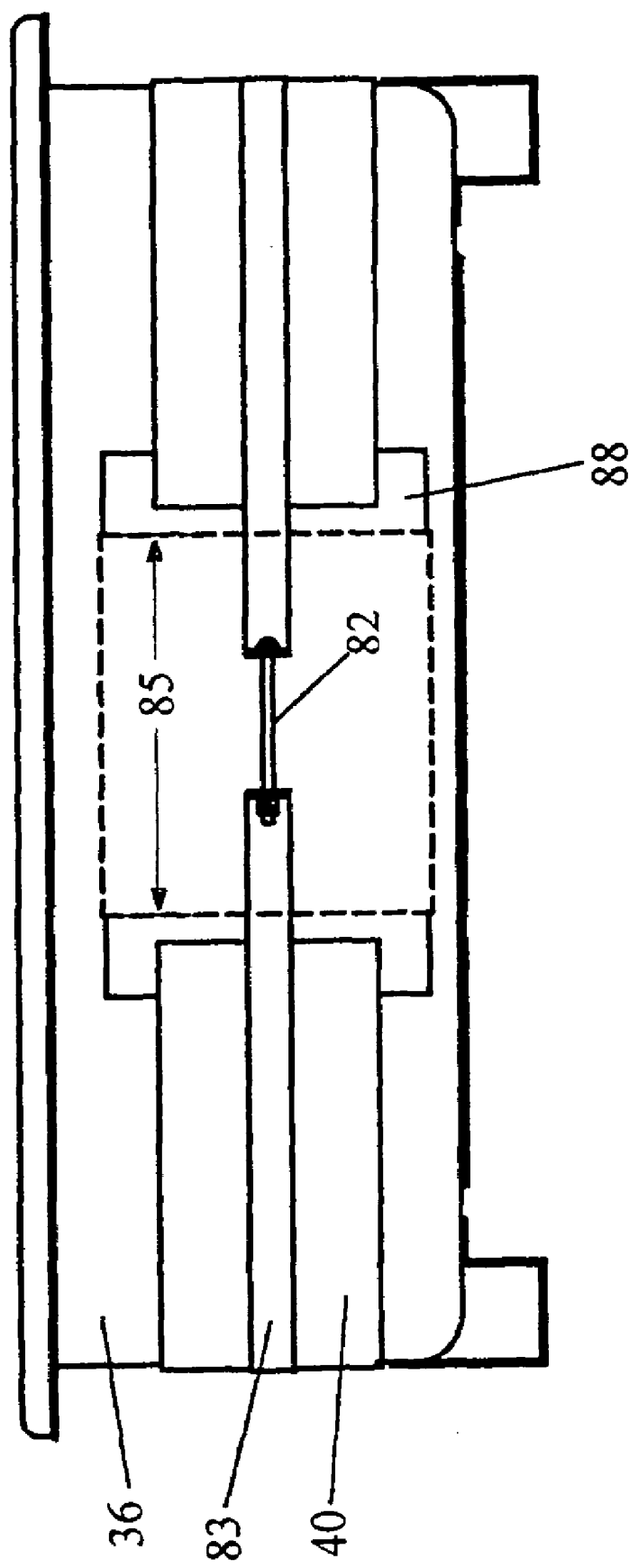
FIG. 9 is an enlarged front elevational view showing the wrap-around heating element installed about the deep well member of the present roasting oven.

In an assembly procedure of the present roasting oven 10, the wrap-around heating element 40 is secured to an outer surface of the heating well 36 by use of an adjustable band clamp, indicated generally at 83, as shown in FIG. 9. The band clamp 83 is constructed of sheet metal such as steel in the form of an elongated belt and includes a turnbuckle mechanism, indicated generally at 82, which is capable of securing the heating element 40 about the outer periphery of the heating well 36. The wrap-around heating element 40 is mounted onto studs 77 (FIGS. 6A and 6B) which are coupled to and project from the band clamp 83 in predetermined locations.

A plurality of elongated slots 79 (FIGS. 6A and 6B) are formed in the terminal ends of the wrap-around heater element 40 so as to be positioned in alignment with studs 77. Studs 77 engage the elongated slots 79 during assembly and provide for slight differences in length and movement between the interior and exterior insulation boards 72 and 74 and the sheet 70.

Referring to FIG. 9, it will be noted that the wrap-around heating element 40 is fabricated to a predetermined length. During assembly it is positioned so as to leave a gap as at 85 corresponding to the position of the temperature control panel 38 and the circuit board 37, which are subject to heat damage. In the construction process the gap 85 may be filled with fiberglass insulation material, mica insulation board, or other appropriate insulating materials to protect the temperature controls.

Referring again to FIGS. 8A–8C, the top heating elements 150, 150' are installed in spaced apart relation to the inner surface 28a of the lid 28 by the use of mounting brackets 94 which project downwardly from the lid 28 into the cooking vessel.

Figure 10:
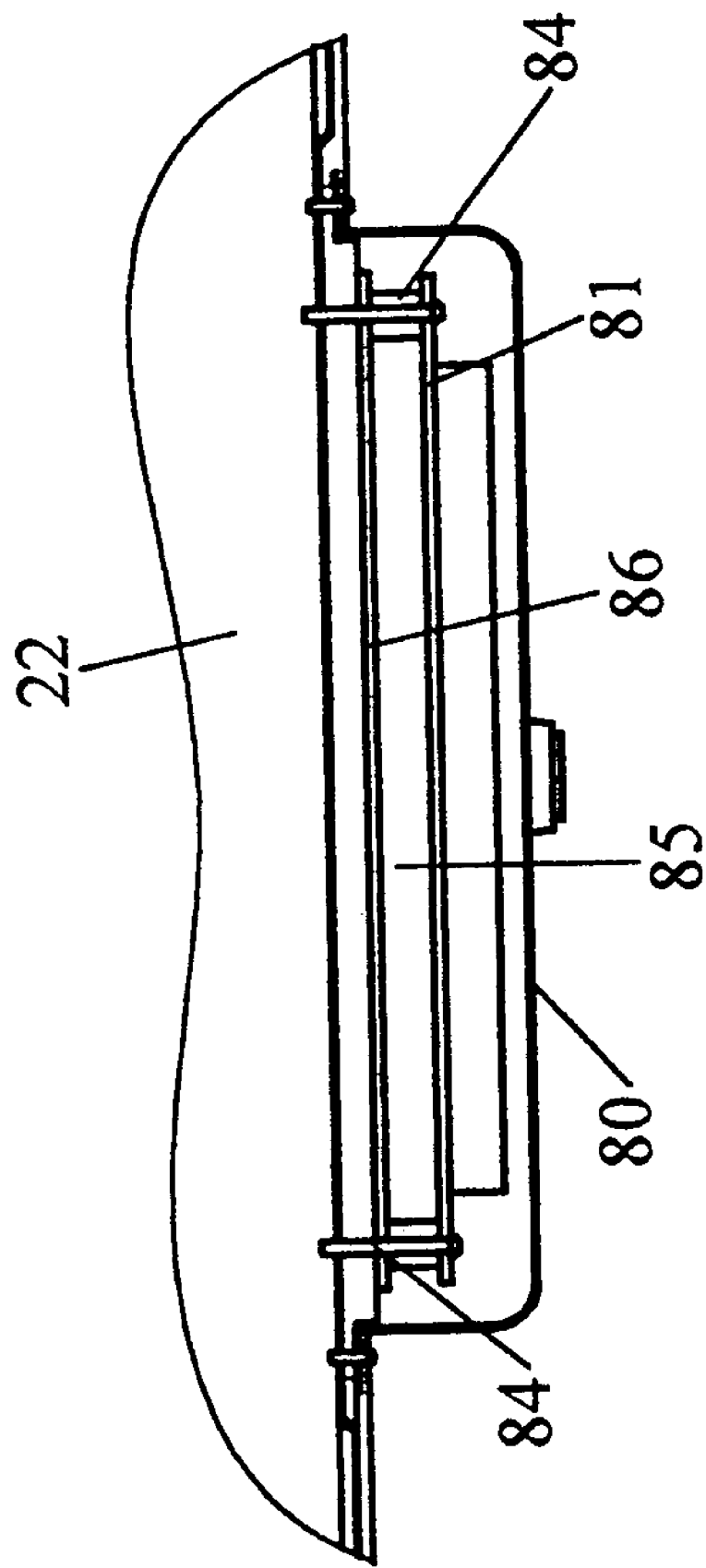
FIG. 10 is a cross-sectional view taken along section line 10—10 of FIG. 2A showing the power supply circuit board within the ventilated compartment.

It will be appreciated that because the present invention omits the conventional bottom heating element of the prior art, the temperatures achieved on the undersurface of the heating well 36 and housing 22 in operation are relatively lower in comparison to prior art cookers. Accordingly, the roasting oven 10 includes a ventilated compartment 80 as shown in FIG. 10, which is located on the undersurface of the housing 22 and functions to protect the power supply circuit board 81 from heat damage. This design isolates the power supply circuit board 81 from the rising heat of the oven and facilitates the use of the relatively high wattage heating elements 40 and 150 required for the large capacity of the present roasting oven.

The power supply circuit board 81 is mounted in space to-part relation to the undersurface of the housing 22 by the use of spacers 84 so as to create an air gap as at 85 to further isolate the circuit board 81 from the housing 22 and the heat source. In addition, a layer of mica insulation board or other suitable insulating material is installed as at 86 to further insulate and protect the power supply circuit board 81.

Figure 11:
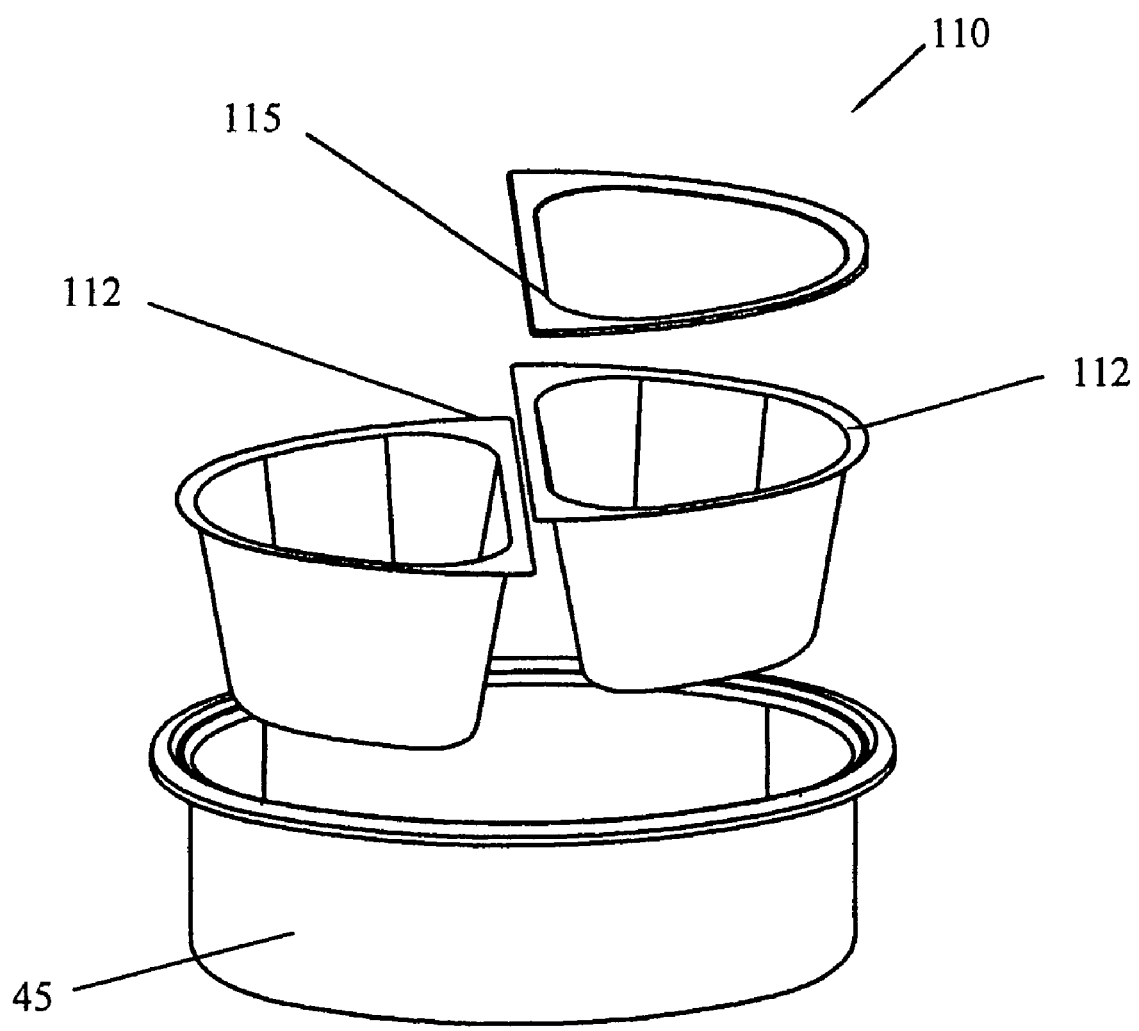
FIG. 11 is an exploded perspective view showing the optional serving set of the present invention

Referring to FIG. 11 the present oven is provided with an optional serving set, indicated generally at 110. In the preferred embodiment the serving set is comprised of a plurality of serving containers 112 which closely conform to the shape and dimensions of the cooking liner 45 and are inserted therein. The serving containers 112 are provided with lids 115 to maintain the cooked food in warm condition. The serving set 110 is provided in a variety of materials and/surface finishes at the option of the consumer.

Figure 12:
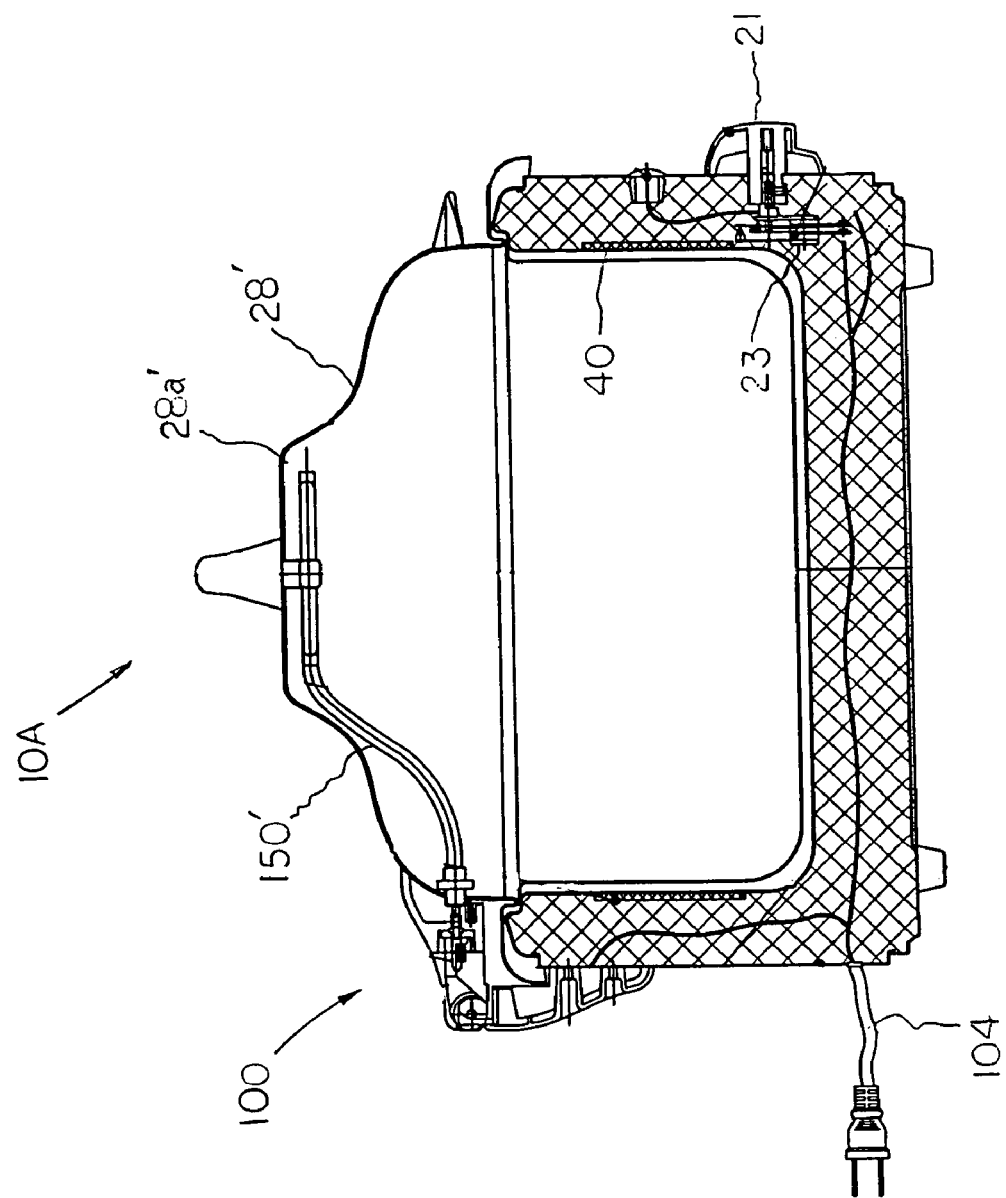
FIG. 12 is a transverse cross-section of another embodiment of the roasting oven showing a modified lid structure.

Referring to FIG. 12 there is shown another embodiment of the present roasting oven, indicated generally at 10A. The roasting oven 10A is substantially similar in its overall construction to the embodiments disclosed hereinabove with reference to FIGS. 2A and 2B except that the roasting oven 10A is provided with a modified electrical circuit including a standard electromechanical power switch 21 and a rheostatic temperature controller 23 (see FIG. 5B) to carry out the functions of the oven. The embodiment shown in FIG. 12 features a wrap-around heating element, indicated generally at 40, and a modified top heating element, indicated generally at 150'.

It can be seen in FIG. 12 that the top heating element 150' resides in an inverted recess 28a' formed within a modified lid 28' to provide increased capacity within the oven 10A to accommodate oversize food items such as a large turkey, for example. The heating element 150' is configured to follow the contour of the modified lid 28' and is mounted within the uppermost portion of recess 28a' within lid 28' as shown.

Figure 13:
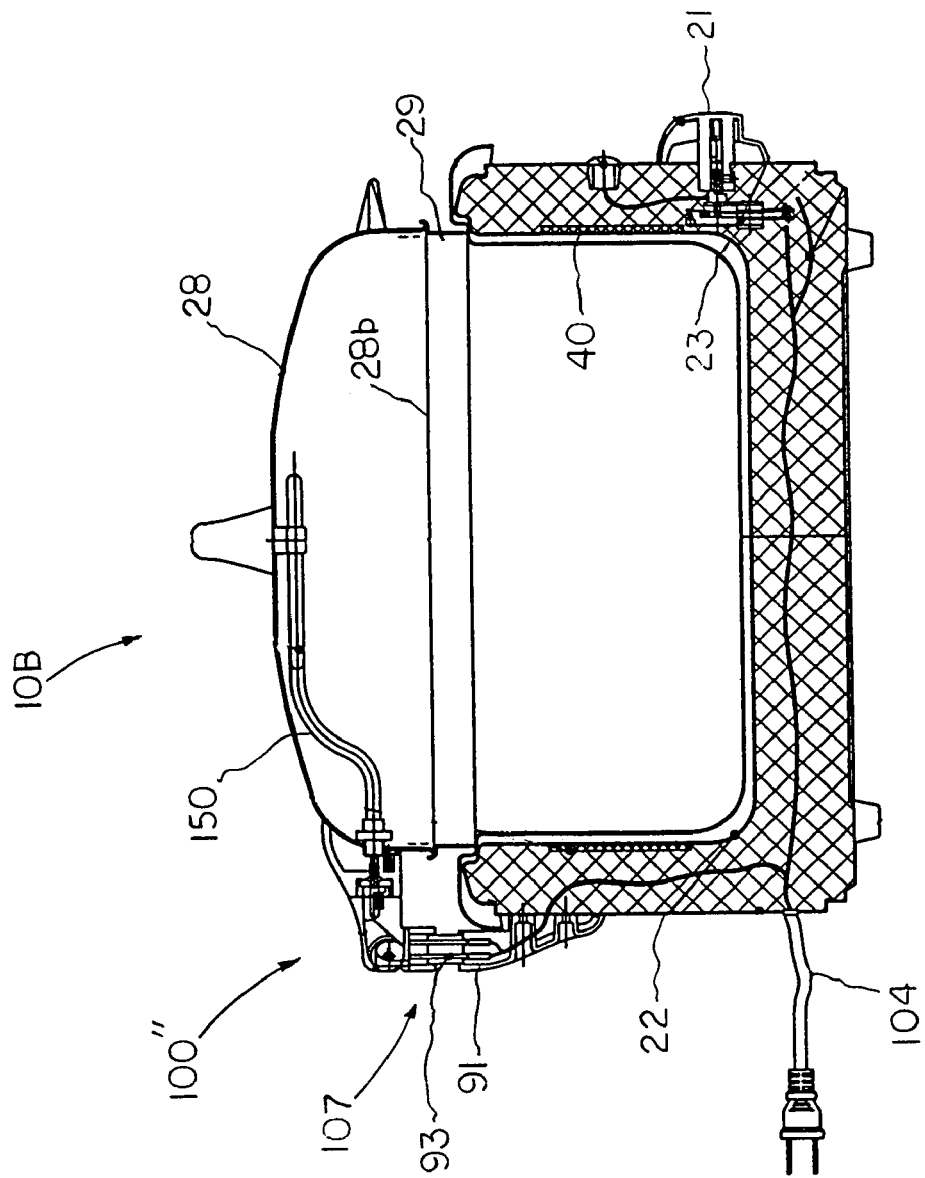
FIG. 13 is a transverse cross-section of another embodiment of the roasting oven featuring an extendable hinge mechanism and a lid spacer.

With reference to FIG. 13 there is shown another embodiment of the present roasting oven, indicated generally at 10B. The present roasting oven 10B is also substantially similar in its overall construction to the embodiments previously disclosed hereinabove. The roasting oven 10B is also provided with a standard electromechanical power switch 21 and a rheostatic temperature controller 23 to carry out the electrical functions of the oven. The embodiment shown in FIG. 13 also features a wrap-around heating element, indicated generally at 40, and a top heating element, indicated generally at 150 as disclosed hereinabove. Advantageously, the roasting oven 10B includes a modified hinge mechanism 100", which permits the lid 28 to be raised upwardly to accommodate an oversize food item in the Up or extended position illustrated (FIG. 13).

In this embodiment the top heating element 150 is electrically connected to the power source via an extensible hinge assembly, indicated generally at 107, including telescoping pin connectors 93, which are received in an electrical plug assembly 91. Electrical wiring interconnnects the plug assembly 91 to a power cord 104, which extends from the housing 22 as shown to a 110V power source.

In the extended position of the hinge assembly 107, a lid extension or spacer 29 is provided which engages the lower peripheral edge 28b of the lid 28 and extends to the housing 22 as shown. Spacer 29 is a sheet metal construction, which is temporarily installed into lid 28 by the user when needed to cook an oversize food item and is conveniently removed by the user when the hinge assembly 107 is used in the Down position at the opposite extent of its travel. In the alternative, the spacer 29 may be permanently affixed to the lid 28 by any suitable means and utilized to cook oversize food items exclusively.

Figure 14A:
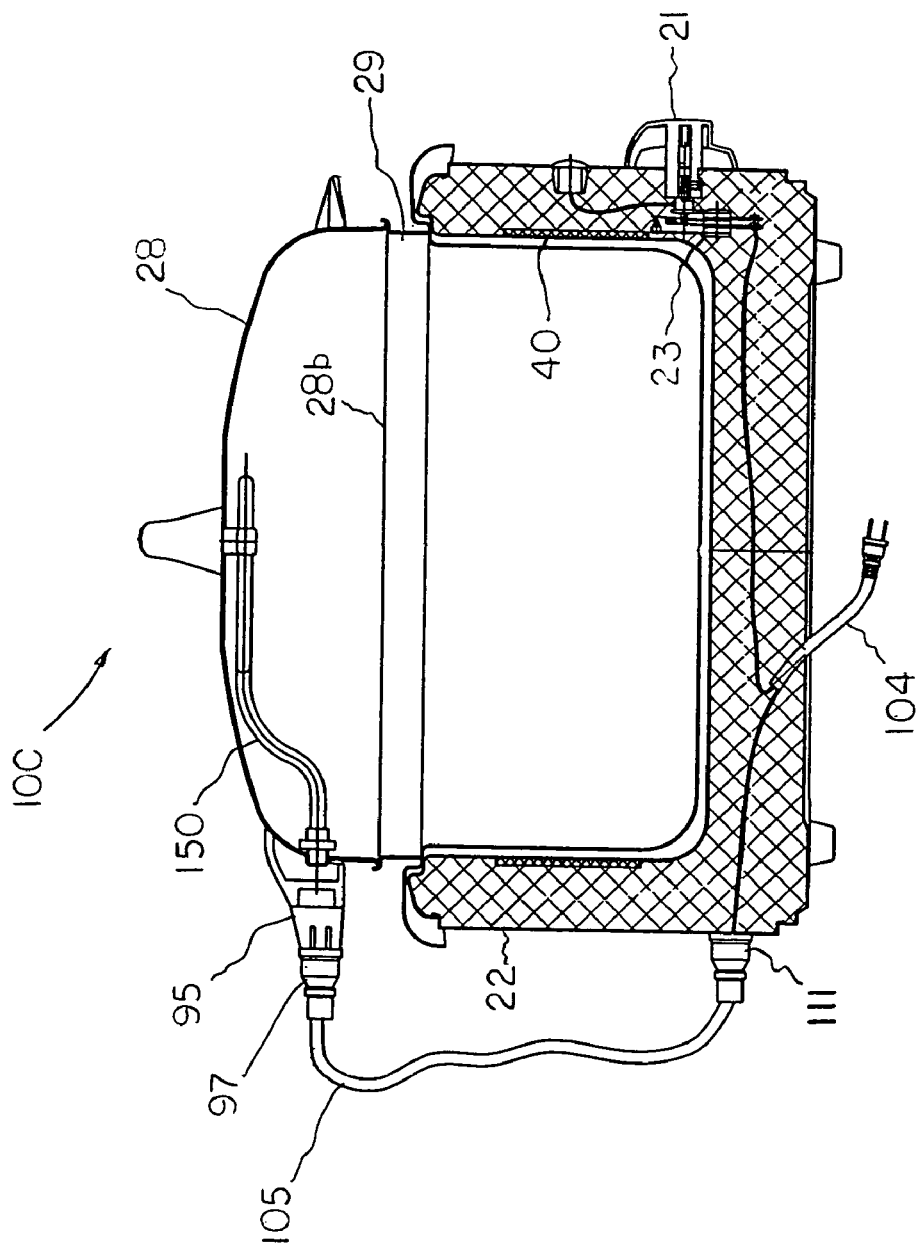
FIG. 14A is a transverse cross-section of another embodiment of the roasting oven without a hinge mechanism and having a single power supply.

Referring now to FIG. 14A there is shown another embodiment of the present roasting oven, indicated generally at 10C. The present roasting oven 10C is similar in its overall construction to the embodiments previously disclosed in that the roasting oven 10C is provided with a standard electromechanical power switch 21 and rheostatic temperature controller 23 to carry out the electrical functions of the oven. The embodiment shown in FIG. 14A also features a wrap-around heating element, indicated generally at 40, and a top heating element, indicated generally at 150. In this version a lid spacer 29 may also be provided which engages the lower peripheral edge 28b of the lid 28 and rests on the upper edge of the housing 22 as shown.

However, it can be seen that this embodiment represents a substantial departure in that it lacks a hinge mechanism between the housing 22 and the lid 28. The top heating element 150 is electrically connected to a secondary power cord 105 including plug 97, which is electrically connected to the main power cord 104 as shown. Power cord 105 is connected to an auxiliary power outlet as at 111 at a first end thereof and received within plug receptacle 95 at an opposite end, which is attached to lid 28 and electrically connected to top heating element 150. In this configuration a single power source supplies both heating elements 40, 150, but the top heating element 150 can be used selectively by detaching the plug 97.

Figure 14B:
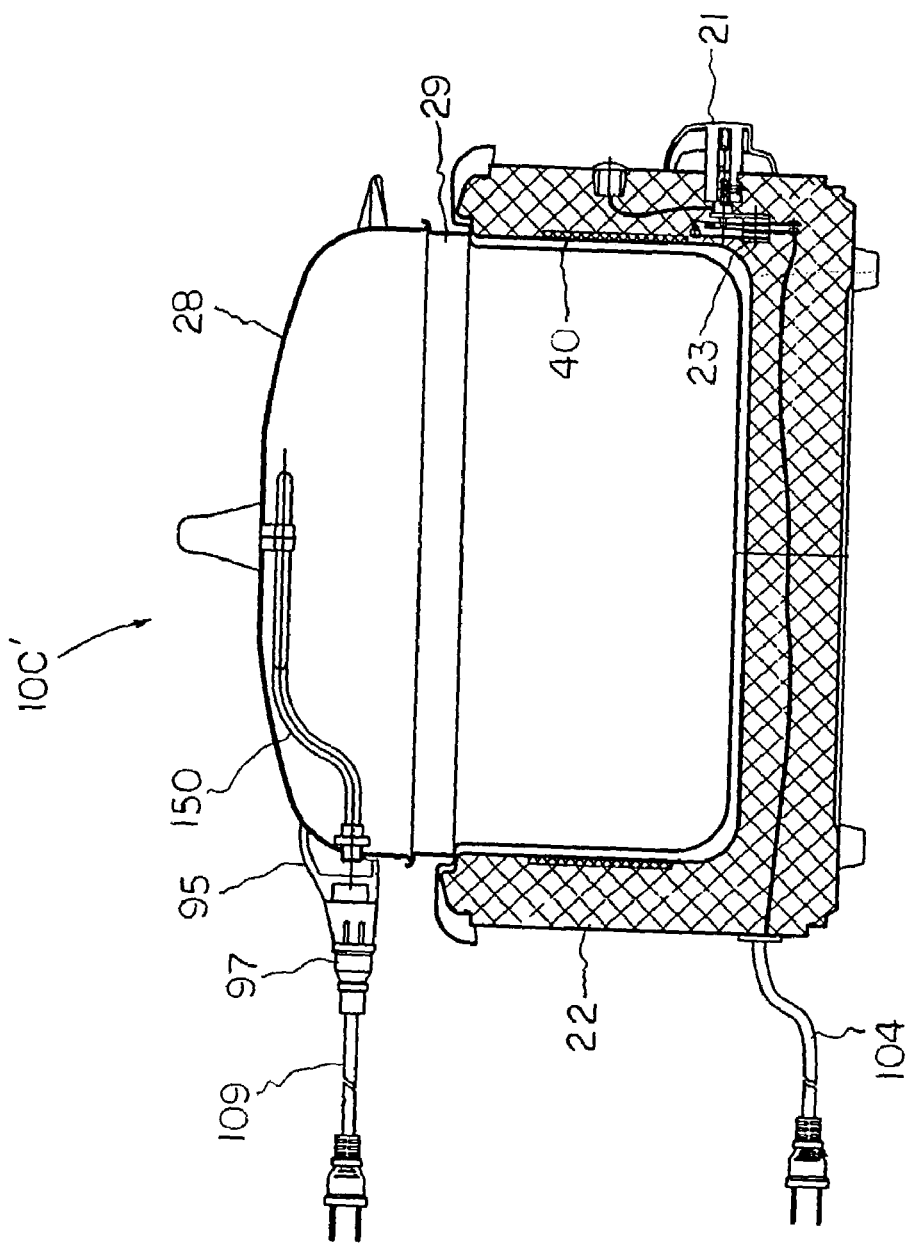
FIG. 14B is a transverse cross-section of another embodiment of the roasting oven without a hinge mechanism and having dual power supplies.

In another embodiment of the roasting oven, indicated generally at 10C' and shown in FIG. 14B, the top heating element 150 is independently connected to a source of power via a separate power cord 109 including a plug 97. As in the previous embodiment shown in FIG. 14A, plug 97 is received in a plug receptacle 95 which is attached to lid 28 and electrically connected to top heating element 150 and, thus, it can be used selectively, if at all.

Figure 15A:
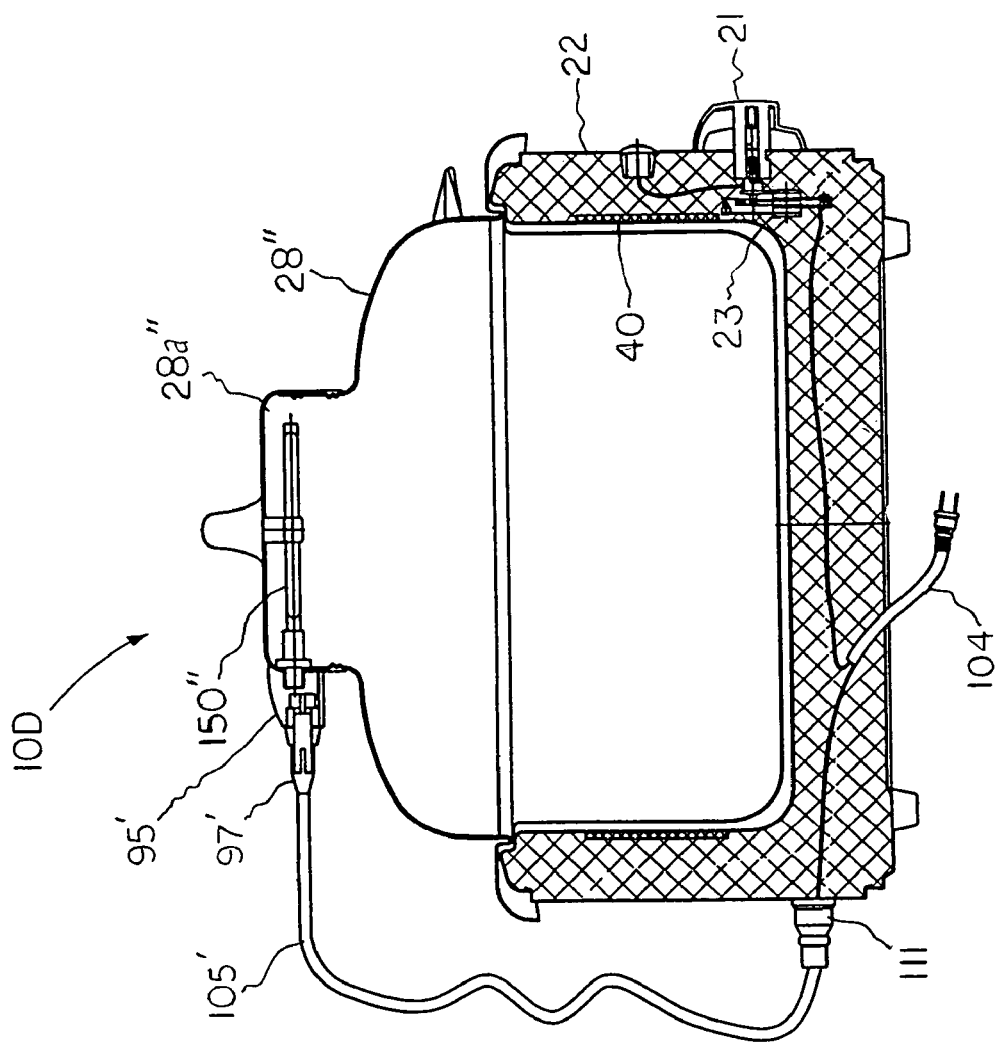
FIG. 15A is a transverse cross-section of another embodiment of the roasting oven without a hinge mechanism having a single power supply.

Referring now to FIG. 15A there is shown another embodiment of the roasting oven, indicated generally at 10D. The present roasting oven 10D is similar in its overall construction to the embodiments previously disclosed in that the roasting oven 10D is also provided with a standard electromechanical power switch 21 and rheostatic temperature controller 23 to carry out the electrical functions of the oven. The embodiment shown in FIG. 15A also features a wrap-around heating element, indicated generally at 40, and a modified top heating element 150". It can be seen in FIG. 15A that the top heating element 150" is installed in a modified lid 28" having an even taller cross-sectional profile than the previously disclosed modified lid 28' (FIG. 12) to accommodate oversize food items such as a large turkey, for example. The heating element 150" is configured to reside within the modified lid 28" and is mounted within the uppermost portion of the inverted recess 28a" of the lid 28" as shown.

It can be seen that the roasting oven 10D also lacks a hinge mechanism between the housing 22 and the lid 28". The top heating element 150" is electrically connected to a secondary power cord 105' including plug 97', which is connected at a first end thereof to an auxiliary power outlet as at 111 located in housing 22. Power cord 105' is received at an opposite end thereof in plug receptacle 95', which is attached to lid 28". In this configuration a single power source feeds both heating elements 40, 150", but the top heating element can be used selectively and the lid 28" removed for convenient cleaning.

Figure 15B:
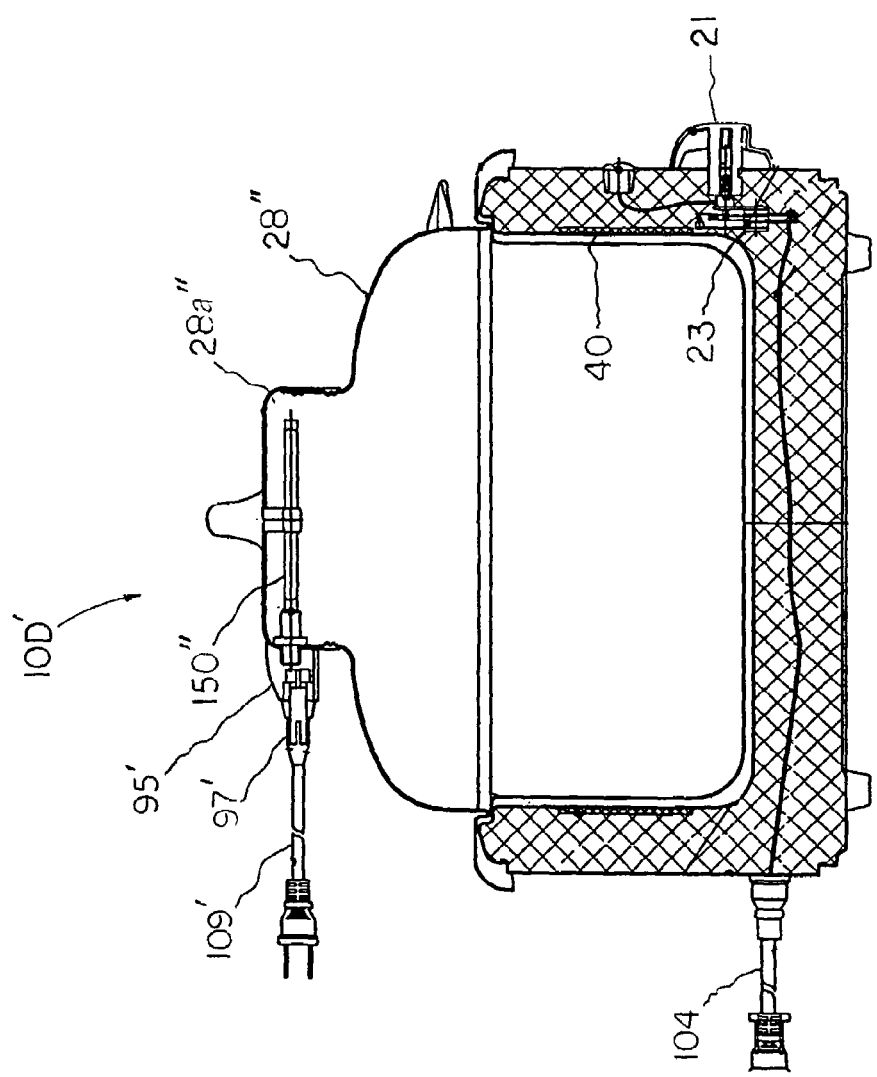
FIG. 15B is a transverse cross-section of another embodiment of the roasting oven without a hinge mechanism having dual power supplies.

In another embodiment of the roasting oven, indicated generally at 10D' and shown in FIG. 15B, the top heating element 150" is independently connected to a 110V power source via a separate power cord 109' including a plug 97'. As in the previous embodiment shown in FIG. 15A, plug 97' is received in a plug receptacle 95' which is attached to lid 28" and electrically connected to top heating element 150" for selective use, if at all.

In summary, the present invention has been developed to provide a roasting oven having a large capacity (i.e. up to 26 quarts) that includes a flexible, wrap-around heating element which is disposed about the heating well for heating the sidewalls thereof and a top heating element for browning.

The wrap-around heating elements 40, 140 are provided in different configurations to facilitate manufacturing and heating. Both the wrap-around heating element 40 and top heating elements 150, 150', 150" are electrically interconnected to a temperature control panel featuring a push-button control film interface for selectively energizing the heating elements or standard electromechanical temperature controls. The present roasting oven includes a detachable lid member having a top browning element featuring quick connect/disconnect electrical connectors to enhance food service and cleaning. In at least one embodiment, the present roasting oven also features an exterior ventilated compartment for housing a power supply circuit board for insulating the same from the high heat source necessary for a roasting oven of this capacity.

In various alternative embodiments the present roasting oven is provided in simplified versions using electromechanical controls and wherein the electroconductive hinge mechanism is omitted. In these embodiments the top and bottom heating elements utilize both single and dual power supply configurations, which can be employed selectively by the user based on the cooking mode required.

Although not specifically illustrated in the drawings, it should be understood that additional equipment and structural components will be provided as necessary, and that all of the components described above are arranged and supported in an appropriate fashion to form a complete and operative roasting oven incorporating features of the present invention.

It is also understood that variations may be made in the present invention without departing from the scope of the invention. For example, the present roasting oven may utilize double-sided and also single-sided heater elements as disclosed herein, which may be advantageous for specific applications.

Moreover, although illustrative embodiments of the invention have been described, a latitude of modification, change, and substitution is intended in the foregoing disclosure, and in certain instances, some features of the invention will be employed without a corresponding use of other features. Accordingly, it is appropriate that the appended claims be construed broadly and consistent with the scope of the invention.

What is claimed is:

1. A roasting oven comprising:
   an outer housing having a lid member including electrically conductive supporting means for attaching said lid member to said housing;
   a heating well residing within said housing, said heating well having a bottom surface with integrally formed sidewalls and an open top;
   heating means including a top heating element disposed in said lid member, said top heating element being electrically connected to a power source via said electrically conductive supporting means, and a wrap-around heating element radially disposed about said heating well and positioned intermediate said housing and said heating well;
   temperature controlling means electrically interconnected to said heating means for regulating the temperature of said heating elements; and
   function controlling means electrically interconnected to said temperature controlling means and to said heating elements enabling said top heating element and said wrap-around heating element to be selectively energized to provide variable cooking modes.

2. The roasting oven of claim 1 wherein said electrically conductive supporting means comprises an extensible hinge mechanism wherein an electrical circuit supplying said top heating element is integrated in the body of said extensible hinge mechanism.

3. The roasting oven of claim 2 wherein said top heating element is electrically connected to a power source by telescoping pin connectors engaging an electrical plug assembly within said extensible hinge mechanism, said extensible hinge mechanism providing increased capacity within said oven to accommodate an oversize food item.

4. The roasting oven of claim 3 wherein said lid member is provided with a lid extension attached to a lower peripheral edge of said lid member and extending to an upper edge of said housing to enclose said increased vertical space.

5. The roasting oven of claim 1 wherein said temperature controlling means comprises a rheostatic temperature controller.

6. The roasting oven of claim 5 wherein said function controlling means comprises a standard electromechanical power switch.

7. A roasting oven comprising:
   an outer housing having a lid member including electrically conductive supporting means for attaching said lid member to said housing, said lid member including an inverted recess formed therein to provide increased volume within said oven to accommodate oversize food items;
   a heating well residing within said housing, said heating well having a bottom surface with integrally formed sidewalls and an open top;
   heating means including a top heating element disposed within inverted recess formed in said lid member, said top heating element being electrically connected to a power source via said electrically conductive supporting means, and a wrap-around heating element radially disposed about said heating well and positioned intermediate said housing and said heating well;
   temperature controlling means electrically interconnected to said heating means for regulating the temperature of said heating elements; and
   function controlling means electrically interconnected to said temperature controlling means and to said heating elements enabling said top heating element and said wrap-around heating element to be energized.

8. The roasting oven of claim 7 wherein said electrically conductive supporting means comprises a hinge mechanism wherein an electrical circuit supplying said top heating element is integrated into the body of said hinge mechanism.

9. The roasting oven of claim 8 wherein said top heating element is electrically connected to a power source by a pin connector attached by electrical wiring to an electrical plug assembly within said hinge mechanism wherein the electrical circuit is completed when said hinge mechanism is in a closed position.

10. The roasting oven of claim 7 wherein said temperature controlling means comprises a rheostatic temperature controller.

11. The roasting oven of claim 10 wherein said function controlling means comprises a standard electromechanical power switch.

12. A roasting oven comprising:
an outer housing having a lid member;
a heating well residing within said housing, said heating well having a bottom surface with integrally formed sidewalls and an open top;
heating means including a top heating element disposed in said lid member and a wrap-around heating element radially disposed about said heating well and positioned intermediate said housing and said heating well;
temperature controlling means electrically interconnected to said heating means for regulating the temperature of said heating elements; and
function controlling means electrically interconnected to said temperature controlling means and to said heating elements enabling said top heating element and said wrap-around heating element to be selectively energized to provide variable cooking modes.

13. The roasting oven of claim 12 wherein said top heating element and said wrap-around heating element are electrically connected to a single power source by a main power cord, said top heating element being connected via a secondary power cord to an auxiliary power outlet integrated within said housing.

14. The roasting oven of claim 13 wherein said lid member is provided with a lid extension attached to a lower peripheral edge of said lid member, wherein said lid extension is disposed intermediate said lid member and an upper edge of said housing to provide increased capacity within said oven.

15. The roasting oven of claim 12 wherein said top heating element and said wrap-around heating element are both electrically connected to remote power sources by separate power cords.

16. The roasting oven of claim 15 wherein said lid member is provided with a lid extension attached to a lower peripheral edge of said lid member, wherein said lid extension is disposed intermediate said lid member and an upper edge of said housing to provide increased capacity within said oven.

17. A roasting oven comprising:
an outer housing including a lid member having an inverted recess formed therein to provide increased vertical clearance within said oven to accommodate oversize food items;
a heating well residing within said housing, said heating well having a bottom surface with integrally formed sidewalls and an open top;
heating means electrically connected to a power source, wherein said heating means includes a top heating element disposed in said inverted recess of said lid member, and a wrap-around heating element radially disposed about said heating well and positioned intermediate said housing and said heating well;
temperature controlling means electrically interconnected to said heating means for regulating the temperature of said heating elements; and
function controlling means electrically interconnected to said temperature controlling means and to said heating elements enabling said top heating element and said wrap-around heating element to be energized to provide variable cooking modes.

18. The roasting oven of claim 17 wherein said top heating element and said wrap-around heating element are electrically connected to a singular power source by a main power cord, said top heating element being connected via a secondary power cord to an auxiliary power outlet integrated into said housing.

19. The roasting oven of claim 17 wherein said top heating element and said wrap-around heating element are both electrically connected to remote power sources by separate power cords.

* * * * *